United States Patent
Wang et al.

(10) Patent No.: US 12,348,757 B2
(45) Date of Patent: Jul. 1, 2025

(54) CROSS RANDOM ACCESS POINT SIGNALING IN VIDEO CODING

(71) Applicants: Beijing Bytedance Network Technology Co., Ltd., Beijing (CN); Bytedance Inc., Los Angeles, CA (US)

(72) Inventors: Ye-Kui Wang, San Diego, CA (US); Yang Wang, Beijing (CN); Li Zhang, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 26 days.

(21) Appl. No.: 18/343,307

(22) Filed: Jun. 28, 2023

(65) Prior Publication Data

US 2023/0345032 A1  Oct. 26, 2023

Related U.S. Application Data

(63) Continuation of application No. PCT/CN2021/141937, filed on Dec. 28, 2021.

(30) Foreign Application Priority Data

Dec. 28, 2020 (WO) ................ PCT/CN2020/139893

(51) Int. Cl.
*H04N 19/503* (2014.01)
*H04N 19/105* (2014.01)
(Continued)

(52) U.S. Cl.
CPC ......... *H04N 19/503* (2014.11); *H04N 19/105* (2014.11); *H04N 19/109* (2014.11);
(Continued)

(58) Field of Classification Search
CPC ...................................................... H04N 19/00
See application file for complete search history.

(56) References Cited

U.S. PATENT DOCUMENTS

| | | |
|---|---|---|
| 2014/0016707 A1 | 1/2014 | Wang |
| 2016/0219301 A1 | 7/2016 | Pettersson |

(Continued)

FOREIGN PATENT DOCUMENTS

| | | |
|---|---|---|
| CN | 101998142 A | 3/2011 |
| CN | 108141583 A | 6/2018 |

(Continued)

OTHER PUBLICATIONS

Document: JVET-N0072-v1, Chen, L., et al., "AHG17: New NAL unit types for VVC," Joint Video Experts Team (JVET) of ITU-T SG 16 WP 3 and ISO/IEC JTC 1/SC 29/WG 11 14th Meeting: Geneva, Switzerland, Mar. 19-27, 2019, 6 pages.

(Continued)

*Primary Examiner* — Kyle M Lotfi
(74) *Attorney, Agent, or Firm* — Conley Rose, P.C.

(57) ABSTRACT

A mechanism for processing video data is disclosed. An indication is signaled. The indication indicates whether a picture following a dependent random access point (DRAP) picture in decoding order and preceding the DRAP picture in output order is permitted to refer to a reference picture positioned prior to the DRAP picture in decoding order for inter prediction. A conversion is performed between a visual media data and a bitstream based on the indication.

20 Claims, 9 Drawing Sheets

Picture 4: IDR
Picture 10: DRAP/CRR
Picture 8: Follows DRAP/CRR in Coding Order and Precedes DRAP/CRR in Output Order

(51) Int. Cl.

| | |
|---|---|
| *H04N 19/109* | (2014.01) |
| *H04N 19/12* | (2014.01) |
| *H04N 19/132* | (2014.01) |
| *H04N 19/136* | (2014.01) |
| *H04N 19/172* | (2014.01) |
| *H04N 19/184* | (2014.01) |
| *H04N 19/46* | (2014.01) |
| *H04N 19/70* | (2014.01) |

(52) U.S. Cl.
CPC ........... *H04N 19/12* (2014.11); *H04N 19/132* (2014.11); *H04N 19/136* (2014.11); *H04N 19/172* (2014.11); *H04N 19/184* (2014.11); *H04N 19/46* (2014.11); *H04N 19/70* (2014.11)

(56) References Cited

U.S. PATENT DOCUMENTS

| | | | |
|---|---|---|---|
| 2016/0219306 | A1 | 7/2016 | Pettersson |
| 2016/0373777 | A1* | 12/2016 | Pettersson ............ H04N 19/105 |
| 2020/0059666 | A1 | 2/2020 | Pettersson et al. |
| 2020/0177923 | A1* | 6/2020 | Chen .................... H04N 19/503 |
| 2022/0103781 | A1 | 3/2022 | Wang |
| 2023/0164371 | A1 | 5/2023 | Denoul et al. |

FOREIGN PATENT DOCUMENTS

| | | |
|---|---|---|
| CN | 111526368 A | 8/2020 |
| EP | 3975569 A1 | 3/2022 |
| JP | 2015527813 A | 9/2015 |
| JP | 2017522766 A | 8/2017 |
| JP | 2017525175 A | 8/2017 |
| JP | 2022056417 A | 4/2022 |
| WO | 2015192990 A1 | 12/2015 |
| WO | 2020058494 A1 | 3/2020 |
| WO | 2022143615 A1 | 7/2022 |
| WO | 2022148269 A1 | 7/2022 |

OTHER PUBLICATIONS

Japanese Office Action from Japanese Patent Application No. 2023-539540 dated Aug. 6, 2024, 18 pages.
Japanese Office Action from Japanese Patent Application No. 2023-539839 dated Jul. 30, 2024, 5 pages.
Document: JVET-U0084-v1, Ye-Kui Wang, et al., "AHG9: Cross RAP referencing (CRR) SEI message," Joint Video Experts Team (JVET) of ITU-T SG 16 WP 3 and ISO/IEC JTC 1/SC 29, 21st Meeting, by teleconference, Jan. 6-15, 2021, 6 pages.
Document: JVET-V0065-v1, Ye-Kui Wang, et al., "AHG9: On the DRAP and EDRAP indication SEI messages," Joint Video Experts Team (JVET) of ITU-T SG 16 WP 3 and ISO/IEC JTC 1/SC 29, 22nd Meeting, by teleconference, Apr. 20-28, 2021, 4 pages.
Extended European Search Report from European Patent Application No. 21914349.2 dated Apr. 11, 2024 (9 pages).
Extended European Search Report from European Patent Application No. 21917309.3 dated Jun. 6, 2024 (11 pages).
Document: JVET-M0360-v4, Yu, H., et al., "Video coding based on cross RAP referencing (CRR)," Joint Video Exploration Team (JVET) of ITU-T SG 16 WP 3 and ISO/IEC JTC 1/SC 29/WG 11 13th Meeting: Marrakech, MA, Jan. 9-18, 2019, 6 pages.
Document: JVET-N0119-v2, Wang, Y., et al., "AHG17: EDR—external decoding refresh," Joint Video Experts Team (JVET) of ITU-T SG 16 WP 3 and ISO/IEC JTC 1/SC 29/WG 11 14th Meeting: Geneva, CH, Mar. 19-27, 2019, 4 pages.
Document: JVET-O0149-v1, Wang, Y., et al., "AHG17: On external decoding refresh (EDR)," Joint Video Experts Team (JVET) of ITU-T SG 16 WP 3 and ISO/IEC JTC 1/SC 29/WG 11 15th Meeting: Gothenburg, SE, Jul. 3-12, 2019, 6 pages.
Document: JVET-P0114-v1, Wang, Y., et al., "AHG17: On external decoding refresh (EDR)," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.
Document: JVET-T0071-v1, Wang, Y., et al., "AHG9: SEI messages for support of cross RAP referencing based video coding," Joint Video Experts Team (JVET) of ITU-T SG 16 WP 3 and ISO/IEC JTC 1/SC 29 20th Meeting, by teleconference, Oct. 7-16, 2020, 5 pages.
"Series H: Audiovisual and Multimedia Systems Infrastructure of audiovisual services—Coding of moving video High efficiency video coding," Rec. ITU-T H.265 | ISO/IEC 23008-2 (in force edition), Feb. 2018, 692 pages.
Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
"Series H: Audiovisual and Multimedia Systems Infrastructure of audiovisual services—Coding of moving video Versatile video coding," Rec. ITU-T H.266 | ISO/IEC 23090-3, Aug. 2020, 516 pages.
Document: JVET-S2001-vH, Bross, B., et al., "Versatile Video Coding (Draft 10)," Joint Video Experts Team (JVET) , of ITU-T SG 16 WP 3 and ISO/IEC JTC 1/SC 29/WG 11 19th Meeting: by teleconference, Jun. 22-Jul. 1, 2020, 548 pages.
"Series H: Audiovisual and Multimedia Systems Infrastructure of audiovisual services—Coding of moving video Versatile supplemental enhancement information messages for coded video bitstreams," Rec. ITU-T Rec. H.274 | ISO/IEC 23002-7, Aug. 2020, 86 pages.
Document: JVET-S2007-v7, Boyce, J., et al., "Versatile supplemental enhancement information messages for coded video bitstreams (Draft 5)," Joint Video Experts Team (JVET) of ITU-T SG 16 WP 3 and ISO/IEC JTC 1/SC 29/WG 11 18th Meeting: by teleconference, Apr. 15-24, 2020, 85 pages.
"Information technology—Coding of audio-visual objects—Part 12: ISO base media file format, Technical Corrigendum," ISO/IEC 14496-12:2015/Cor.1, ISO/IEC JTC 1/SC 29/WG 11, Jun. 3, 2016, 303 pages.
"Information technology—Coding of audio-visual objects—Part 15: Carriage of network abstraction layer (NAL) unit structured video in the ISO base media file format," ISO/IEC 14496-15, First edition, Apr. 15, 2004, 29 pages.
"Information technology—Coding of audio-visual objects—Part 15: Carriage of network abstraction layer (NAL) unit structured video in the ISO base media file format—Amendment 2: Carriage of VVC and EVC in ISOBMFF," ISO/IEC JTC 1/SC 29/WG 03 output document N0035, Nov. 2020, 64 pages.
"Information technology—High efficiency coding and media delivery in heterogeneous environments—Part 12: Image File Format—Amendment 3: Support for VVC, EVC, slideshows and other improvements," ISO/IEC JTC 1/SC 29/WG 03 output document N0038, Nov. 2020, 29 pages.
JVT, "Draft Text of Final Draft International Standard for Advanced Video Coding (ITU-T Rec. H.264 | ISO/IEC 14496-10 AVC)," ISO/IEC JTC 1/SC 29/WG 11 N5555, Draft ISO/IEC 14496-10 : 2002 (E), Mar. 2003, 251 pages.
Document: JVET-N0494-v3, Pettersson, M., et al., "AHG17 : Dependent random access I-25 point pictures in VVC," Joint Video Experts Team (JVET) of ITU-T SG 16 WP 3 and ISO/IEC JTC 1/SC 29, 14th Meeting: Geneva, CH, Mar. 19-27, 2019, 8 pages.
Document: JVET-U0084-v2, Wang, Y., et al., "AHG9: Cross RAP referencing (CRR) SEI message," Joint Video Experts Team (JVET) of ITU-T SG 16 WP 3 and ISO/IEC JTC 1/SC 29, 21st Meeting, by teleconference Jan. 6-15, 2021, 6 pages.
Document: JVET-O0393, Hannuksela M., et al., "AHG17: On cross-RAP referencing," Joint Video Experts Team (JVET) of ITU-T SG 16 WP 3 and ISO/IEC JTC 1/SC 29 15th Meeting: Gothenburg, SE Jul. 3-12, 2019, 5 pages.
Document: JVET-T0066, Skupin, R., et al., "AHG9: IRAP only HRD SEI message," Joint Video Experts Team(JVET) of ITU-T SG 16 WP 3 and ISO/IEC JTC 1/SC 29 20th Meeting, by teleconference Oct. 7-16, 2020 , 16 pages.
International Search Report from PCT Application No. PCT/CN2021/141937 dated Mar. 29, 2022, 9 pages. a.

(56) References Cited

OTHER PUBLICATIONS

International Search Report from PCT Application No. PCT/CN2021/141939 dated Mar. 29, 2022, 11 pages.
International Search Report from PCT Application No. PCT/CN2021/141940 dated Mar. 16, 2022, 10 pages.
International Search Report from PCT Application No. PCT/CN2021/141942 dated Mar. 29, 2022, 9 pages.
Japanese Office Action from Japanese Patent Application No. 2023-539840 dated Aug. 6, 2024, 18 pages.
Final Office Action from U.S. Appl. No. 18/343,370 dated Oct. 15, 2024, 35 pages.

\* cited by examiner

Picture 4: IDR
Picture 10: DRAP/CRR
Picture 8: Follows DRAP/CRR in Coding Order and Precedes DRAP/CRR in Output Order

CROSS RANDOM ACCESS POINT SIGNALING IN VIDEO CODING

CROSS-REFERENCE TO RELATED APPLICATIONS

This application is a continuation of International Patent Application No. PCT/CN2021/141937, filed on Dec. 28, 2021, which claims the priority to and benefits of International Patent Application No. PCT/CN2020/139893 filed Dec. 28, 2020. All the aforementioned patent applications are hereby incorporated by reference in their entireties.

TECHNICAL FIELD

This patent document relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: determining an indication of whether a picture following a dependent random access point (DRAP) picture in decoding order and preceding the DRAP picture in output order is permitted to refer to a reference picture positioned prior to the DRAP picture in decoding order for inter prediction; and performing a conversion between a visual media data and a bitstream based on the indication.

Optionally, in any of the preceding aspects, another implementation of the aspect provides that the DRAP picture is a type 2 DRAP picture.

Optionally, in any of the preceding aspects, another implementation of the aspect provides that the indication further indicates whether the picture is permitted to refer to the reference picture when the reference picture is in a same layer as the picture.

Optionally, in any of the preceding aspects, another implementation of the aspect provides that the indication is signaled in a type 2 DRAP indication Supplemental Enhancement Information (SEI) message.

Optionally, in any of the preceding aspects, another implementation of the aspect provides that the indication is a one bit flag.

Optionally, in any of the preceding aspects, another implementation of the aspect provides that the indication is set to a first value when indicating the picture following the DRAP picture in decoding order and preceding the DRAP picture in output order is permitted to refer to the reference picture positioned prior to the DRAP picture in decoding order for inter prediction.

Optionally, in any of the preceding aspects, another implementation of the aspect provides the indication is set to a second value when indicating the picture following the DRAP picture in decoding order and preceding the DRAP picture in output order is prevented from referring to the reference picture positioned prior to the DRAP picture in decoding order for inter prediction.

Optionally, in any of the preceding aspects, another implementation of the aspect provides that the indication is set in a X value format where X is one or zero and the indication is set to one or zero.

Optionally, in any of the preceding aspects, another implementation of the aspect provides that the indication is set in a one minus X format where X is one or zero and the indication is set to zero or one.

Optionally, in any of the preceding aspects, another implementation of the aspect provides that the indication is a bit in a t2drap_reserved_zero_13bits field.

Optionally, in any of the preceding aspects, another implementation of the aspect provides that the indication is a multi-bit indicator.

Optionally, in any of the preceding aspects, another implementation of the aspect provides that the indication is signaled in a DRAP indication SEI message.

Optionally, in any of the preceding aspects, another implementation of the aspect provides that the DRAP picture is associated with the DRAP indication SEI message.

Optionally, in any of the preceding aspects, another implementation of the aspect provides that the indication is signaled in a SEI message.

Optionally, in any of the preceding aspects, another implementation of the aspect provides that the DRAP picture is associated with the SEI message.

Optionally, in any of the preceding aspects, another implementation of the aspect provides that an absence of the indication in a bitstream indicates the picture following the DRAP picture in decoding order and preceding the DRAP picture in output order is permitted to refer to the reference picture positioned prior to the DRAP picture in decoding order for inter prediction.

Optionally, in any of the preceding aspects, another implementation of the aspect provides that a presence of the indication in a bitstream indicates the picture following the DRAP picture in decoding order and preceding the DRAP picture in output order is prevented from referring to the reference picture positioned prior to the DRAP picture in decoding order for inter prediction.

Optionally, in any of the preceding aspects, another implementation of the aspect provides that a presence of the indication in a bitstream indicates the picture following the DRAP picture in decoding order and preceding the DRAP picture in output order is permitted to refer to the reference picture positioned prior to the DRAP picture in decoding order for inter prediction.

Optionally, in any of the preceding aspects, another implementation of the aspect provides that the picture following the DRAP picture in decoding order and preceding the DRAP picture in output order is prevented from referring to the reference picture positioned prior to the DRAP picture in decoding order for inter prediction.

Optionally, in any of the preceding aspects, another implementation of the aspect provides that the bitstream is constrained such that any picture in a same layer as a DRAP picture and that follows the DRAP picture in decoding order shall follow in output order any picture that is in the same layer and precedes the DRAP picture in decoding order.

Optionally, in any of the preceding aspects, another implementation of the aspect provides that the indication is signaled for each DRAP picture and each type 2 DRAP picture.

Optionally, in any of the preceding aspects, another implementation of the aspect provides that the conversion comprises generating the bitstream according to the visual media data.

Optionally, in any of the preceding aspects, another implementation of the aspect provides that the conversion comprises parsing the bitstream to obtain the visual media data.

A second aspect relates to an apparatus for processing video data comprising a processor and a non-transitory memory with instructions thereon, wherein the instructions upon execution by the processor, cause the processor to perform the method of any of the preceding aspects.

A third aspect relates to a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
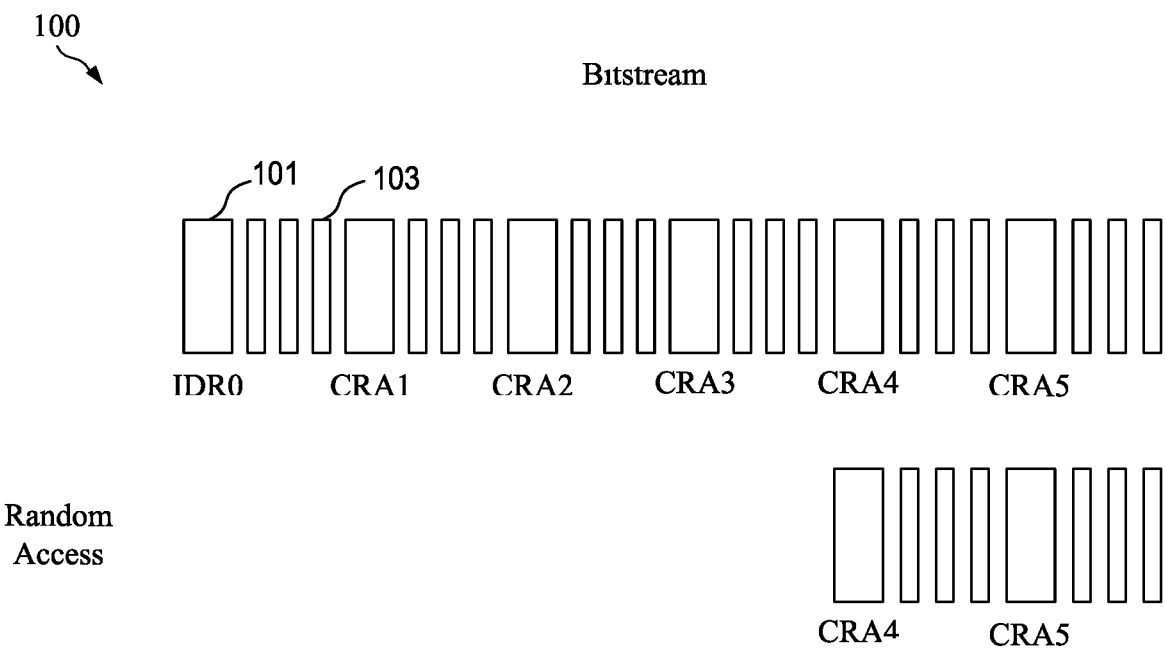
FIG. 1 is a schematic diagram of an example mechanism for random access when decoding a bitstream using IRAP pictures.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Versatile Video Coding (VVC), also known as H.266, terminology is used in some description only for ease of understanding and not for limiting scope of the disclosed techniques. As such, the techniques described herein are applicable to other video codec protocols and designs also. In the present document, editing changes are shown to text by bold italics indicating cancelled text and underline indicating added text, with respect to the VVC specification or International Organization for Standardization (ISO) base media file format (ISOBMFF) file format specification.

This patent document is related to video coding, video file format, video signaling, and video applications. Specifically, this document is related to enhanced signaling of cross Random Access Point (RAP) referencing in video coding based on Supplemental Enhancement Information (SEI) messages, and signaling of Cross RAP Referencing (CRR) in media files. The disclosed examples may be applied individually or in various combination, to any video coding standard or non-standard video codec, such as VVC, and to media files according to any media file formats, such as ISOBMFF.

The present disclosure includes the following abbreviations. Adaptive color transform (ACT), adaptive loop filter (ALF), adaptive motion vector resolution (AMVR), adaptation parameter set (APS), access unit (AU), access unit delimiter (AUD), advanced video coding (Rec. ITU-T H.264|ISO/IEC 14496-10) (AVC), bi-predictive (B), bi-prediction with CU-level weights (BCW), bi-directional optical flow (BDOF), block-based delta pulse code modulation (BDPCM), buffering period (BP), context-based adaptive binary arithmetic coding (CABAC), coding block (CB), constant bit rate (CBR), cross-component adaptive loop filter (CCALF), coded layer video sequence (CLVS), coded layer video sequence start (CLVSS), coded picture buffer (CPB), clean random access (CRA), cyclic redundancy check (CRC), cross RAP referencing (CRR), coding tree block (CTB), coding tree unit (CTU), coding unit (CU), coded video sequence (CVS), coded video sequence start (CVSS), decoding capability information (DCI), decoded picture buffer (DPB), dependent random access point (DRAP), decoding unit (DU), decoding unit information (DUI), exponential-Golomb (EG), k-th order exponential-Golomb (EGk), end of bitstream (EOB), end of sequence (EOS), filler data (FD), first-in, first-out (FIFO), fixed-length (FL), green, blue, and red (GBR), general constraints information (GCI), gradual decoding refresh (GDR), geometric partitioning mode (GPM), high efficiency video coding, also known as Rec. ITU-T H.265|ISO/IEC 23008-2, (HEVC), hypothetical reference decoder (HRD), hypothetical stream scheduler (HSS), intra (I), intra block copy (IBC), instantaneous decoding refresh (IDR), inter layer reference picture (ILRP), intra random access point (IRAP), low frequency non-separable transform (LFNST), least probable symbol (LPS), least significant bit (LSB), long-term reference picture (LTRP), luma mapping with chroma scaling (LMCS), matrix-based intra prediction (MIP), most probable symbol (MPS), most significant bit (MSB), multiple transform selection (MTS), motion vector prediction (MVP), network abstraction layer (NAL), output layer set (OLS), operation point (OP), operating point information (OPI), predictive (P), picture header (PH), picture order count (POC), picture parameter set (PPS), prediction refinement with optical flow (PROF), picture timing (PT), picture unit (PU), quantization parameter (QP), random access decodable leading picture (RADL), random access point (RAP), random access skipped leading picture (RASL), raw byte sequence payload (RBSP), red, green, and blue (RGB), reference picture list (RPL), sample adaptive offset (SAO), sample aspect ratio (SAR), supplemental enhancement information (SEI), slice header (SH), subpicture level information (SLI), string of data bits (SODB), sequence parameter set (SPS), short-term reference picture (STRP), step-wise temporal sublayer access (STSA), truncated rice (TR), transform unit (TU), variable bit rate (VBR), video coding layer (VCL), video parameter set (VPS), versatile supplemental enhancement information, also known as Rec. ITU-T H.274|ISO/IEC 23002-7. (VSEI), video usability information (VUI), and versatile video coding, also known as Rec. ITU-T H.266|ISO/IEC 23090-3, (VVC).

Video coding standards have evolved primarily through the development of the ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the further video coding technologies beyond HEVC, the Joint Video Exploration Team (JVET) was founded by Video Coding Experts Group (VCEG) and MPEG jointly. Many methods have been adopted by JVET and put into the reference software named Joint Exploration Model (JEM). The JVET was later renamed to be the Joint Video Experts Team (JVET) when the Versatile Video Coding (VVC) project officially started. VVC is a coding standard targeting a 50% bitrate reduction as compared to HEVC. VVC has been finalized by the JVET.

VVC and VSEI standards are designed for use in a maximally broad range of applications, including uses such as television broadcast, video conferencing, playback from storage media, adaptive bit rate streaming, video region extraction, composition and merging of content from multiple coded video bitstreams, multiview video, scalable layered coding, and viewport-adaptive three hundred and sixty degree (360°) immersive media.

The Essential Video Coding (EVC) standard (ISO/IEC 23094-1) is another video coding standard developed by MPEG.

File format standards are discussed below. Media streaming applications are typically based on the Internet Protocol (IP), Transmission Control Protocol (TCP), and Hypertext Transfer Protocol (HTTP) transport methods, and typically rely on a file format such as the ISOBMFF. One such streaming system is dynamic adaptive streaming over HTTP (DASH). Video can be encoded in a video format, such as AVC and/or HEVC. The encoded video can be encapsulated in ISOBMFF tracks and included in DASH representations and segments. Important information about the video bitstreams, such as the profile, tier, and level, and many others, may be exposed as file format level metadata and/or in a DASH media presentation description (MPD) for content selection purposes. For example, such information can be used for selection of appropriate media segments both for initialization at the beginning of a streaming session and for stream adaptation during the streaming session.

Similarly, when using an image format with ISOBMFF, a file format specification specific to the image format, such as the AVC image file format and the HEVC image file format, may be employed. The VVC video file format, the file format for storage of VVC video content based on ISOBMFF, is under development by MPEG. The VVC image file format, the file format for storage of image content coded using VVC, based on ISOBMFF, is also under development by MPEG.

Support for random access in HEVC and VVC is discussed below. Random access refers to starting access and decoding of a bitstream from a picture that is not the first picture of the bitstream in decoding order. To support tuning in and channel switching in broadcast/multicast and multi-party video conferencing, seeking in local playback and streaming, as well as stream adaptation in streaming, the bitstream should include frequent random access points. Such random access points are typically intra coded pictures, but may also be inter coded pictures (e.g., in the case of gradual decoding refresh). Intra coded pictures are pictures that are coded by reference to blocks within the picture, and inter coded pictures are pictures that are coded by reference to blocks in other pictures.

HEVC includes signaling of intra random access points (IRAP) pictures in the NAL unit header through NAL unit types. HEVC support three types of IRAP pictures, namely instantaneous decoder refresh (IDR), clean random access (CRA), and broken link access (BLA) pictures. IDR pictures constrain the inter picture prediction structure to not reference any picture before the current group-of-pictures (GOP), also known as closed-GOP random access points. CRA pictures are less restrictive by allowing certain pictures to reference pictures before the current GOP, all of which are discarded in case of a random access. CRA pictures are referred to as open-GOP random access points. BLA pictures usually originate from splicing of two bitstreams or part thereof at a CRA picture, e.g., during stream switching. To enable better systems usage of IRAP pictures, six different NAL units are defined to signal the properties of the IRAP pictures, which can be used to match the stream access point types as defined in the ISO base media file format (ISOBMFF). Such stream access point types are also utilized for random access support in dynamic adaptive streaming over HTTP (DASH).

VVC supports three types of IRAP pictures, two types of IDR pictures (one type with and the other type without associated RADL pictures) and one type of CRA picture. These are used in a similar manner as in HEVC. The BLA picture types in HEVC are not included in VVC. This is because the basic functionality of BLA pictures can be realized by CRA pictures plus the end of sequence NAL unit, the presence of which indicates that the subsequent picture starts a new CVS in a single-layer bitstream. Further, there was a desire in specifying fewer NAL unit types than HEVC during the development of VVC, as indicated by the use of five instead of six bits for the NAL unit type field in the NAL unit header.

Another difference in random access support between VVC and HEVC is the support of GDR in a more normative manner in VVC. In GDR, the decoding of a bitstream can start from an inter coded picture. At the first picture at the random access point, only part of the picture can be correctly decoded. However, after a number of pictures the entire picture region can be correctly decoded and displayed. AVC and HEVC also support GDR, using the recovery point SEI message for signaling of GDR random access points and the recovery points. In VVC, a NAL unit type is specified for indication of GDR pictures and the recovery point is signaled in the picture header syntax structure. A CVS and a bitstream are allowed to start with a GDR picture. Accordingly, an entire bitstream is allowed to contain only inter coded pictures without a single intra coded picture. The main benefit of specifying GDR support this way is to provide a conforming behavior for GDR. GDR enables encoders to smooth the bit rate of a bitstream by distributing intra coded slices or blocks (which are less compressed than inter coded slices/block) across multiple pictures as opposed intra coding entire pictures. This allows significant end-to-end delay reduction, which is considered more important due to the increasing use of ultralow delay applications like wireless display, online gaming, drone-based applications, etc.

Another GDR related feature in VVC is virtual boundary signaling. The boundary between a refreshed region (the correctly decoded region in GDR) and the unrefreshed region at a picture between a GDR picture and a recovery point can be signaled as a virtual boundary. When signaled, in-loop filtering across the boundary would not be applied. This prevents a decoding mismatch for some samples at or near the boundary. This can be useful when the application determines to display the correctly decoded regions during the GDR process. IRAP pictures and GDR pictures can be collectively referred to as random access point (RAP) pictures.

VUI and SEI messages are discussed below. VUI is a syntax structure sent as part of the SPS (and possibly also in a VPS in HEVC). VUI carries information that does not affect the normative decoding process, but that can be used for proper rendering of the coded video. SEI assists in processes related to decoding, display, or other purposes. As with VUI, SEI does not affect the normative decoding process. SEI is carried in SEI messages. Decoder support of SEI messages is optional. However, SEI messages do affect bitstream conformance. For example, if the syntax of an SEI message in a bitstream does not follow the specification, then the bitstream is not conforming. Some SEI messages are used in the HRD specification.

The VUI syntax structure and most SEI messages used with VVC are not specified in the VVC specification, but rather in the VSEI specification. The SEI messages used for HRD conformance testing are specified in the VVC specification. VVC defines five SEI messages relevant for HRD conformance testing and VSEI specifies twenty additional SEI messages. The SEI messages carried in the VSEI specification do not directly impact conforming decoder behavior and have been defined so that they can be used in a coding-format-agnostic manner, allowing VSEI to be used in with other video coding standards in addition to VVC. Rather than referring specifically to VVC syntax element names, the VSEI specification refers to variables, whose values are set within the VVC specification.

Compared to HEVC, the VUI syntax structure of VVC focuses only on information relevant for proper rendering of the pictures and does not contain any timing information or bitstream restriction indications. In VVC, the VUI is signaled within the SPS, which includes a length field before the VUI syntax structure to signal the length of the VUI payload in bytes. This allows a decoder to easily jump over the information, and allows for VUI syntax extensions by directly adding new syntax elements to the end of the VUI syntax structure in a similar manner as a SEI message syntax extension.

The VUI syntax structure contains the following information: an indication of the content being interlaced or progressive; an indication of whether the content contains frame-packed stereoscopic video or projected omnidirectional video; a sample aspect ratio; an indication of whether the content is appropriate for overscan display; a color description, including color primaries, matrix, and transfer characteristics, which supports signaling ultra high definition (UHD) vs high definition (HD) color space as well as high dynamic range (HDR); and an indication of chroma location compared to luma (for which the signaling was clarified for progressive content compared to HEVC).

When the SPS does not contain any VUI, the information is considered unspecified and is conveyed via an external means or specified by the application if the content of the bitstream is intended for rendering on a display.

Table 1 lists the SEI messages specified for VVC, as well as the specification containing their syntax and semantics. Of the twenty SEI messages specified in the VSEI specification, many were inherited from HEVC (for example, the filler payload and both user data SEI messages). Some SEI messages are used for correct processing or rendering of the coded video content. This is the case for the mastering display color volume, the content light level information, and/or the alternative transfer characteristics SEI messages, which are particularly relevant for HDR content. Other examples include the equirectangular projection, sphere rotation, region-wise packing, and/or omnidirectional viewport SEI messages, which are relevant for signaling and processing of 360° video content.

TABLE 1

| List of SEI messages in VVC v1 | |
| --- | --- |
| Name of SEI message | Purpose of SEI message |
| SEI messages specified in the VVC specification | |
| Buffering period | Initial CPB removal delays for HRD |
| Picture timing | CPB removal delays and DPB output delays for HRD |
| Decoding unit information | CPB removal delays and DPB output delays for DU based HRD |

TABLE 1-continued

List of SEI messages in VVC v1

| Name of SEI message | Purpose of SEI message |
| --- | --- |
| Scalable nesting | Mechanism to associate SEI messages with specific output layer sets, layers or sets of subpictures |
| Subpicture level information | Information about levels for subpicture sequences |

SEI messages specified in the VSEI specification

| | |
| --- | --- |
| Filler payload | Filler data for adjusting the bit rate |
| User data registered by Rec. ITU-T T.35 | Convey user data, can be used as container for data by other organizations |
| User data unregistered | |
| Film grain characteristics | Model for film grain synthesis |
| Frame packing arrangement | Information about how stereoscopic video is coded in the bitstream, e.g., by packing the two pictures for each time instance of the two views into one picture |
| Parameter sets inclusion indication | Indication of whether the sequence contains all the required NAL units for decoding |
| Decoded picture hash | Hash of the decoded pictures for error detection |
| Mastering display color volume | Description of the color volume of a display used to author the content |
| Content light level information | Upper bounds for the nominal target brightness light level of the content |
| Dependent RAP indication | Indicates a picture using only the preceding IRAP picture for inter prediction referencing |
| Alternative transfer characteristics | Preferred alternative value for the transfer characteristics of the content |
| Ambient viewing environment | Characteristics of the nominal ambient viewing environment for the display of the content, can be used to assist the receiver in processing content depending on the local viewing environment |
| Content color volume | Color volume characteristics of the associated picture |
| Equirectangular projection | Indication of the projection format applied, including information needed for remapping of the content onto a sphere for rendering in omnidirectional video applications |
| Generalized cubemap projection | |
| Sphere rotation | Information on rotation angles for conversion between the global and local coordinate axes, for use in omnidirectional video applications |
| Region-wise packing | Information needed for remapping of the cropped decoded pictures, involving region-wise operations like repositioning, resizing and rotation, onto projected pictures, for use in omnidirectional video applications |
| Omnidirectional viewport | Coordinates of one or more regions corresponding to viewports recommended for display, for use in omnidirectional video applications |
| Frame-field information | Indicates how the associated picture should be displayed, its source scan, and whether it is a duplicate of a previous picture |
| Sample aspect ratio information | Information about sample aspect ratio of the associated picture |

SEI messages specified for VVC v1 include the frame-field information SEI message, the sample aspect ratio information SEI message, and the subpicture level information SEI message. The frame-field information SEI message contains information to indicate how the associated picture should be displayed (such as field parity or frame repetition period), the source scan type of the associated picture, and whether the associated picture is a duplicate of a previous picture. This information may be signaled in the picture timing SEI message in some video coding standards, together with the timing information of the associated picture. However, the frame-field information and timing information are two different kinds of information that are not necessarily signaled together. In a typical example, the timing information is signaled at the systems level, but the frame-field information is signaled within the bitstream. Therefore, the frame-field information is removed from the picture timing SEI message and signaled within a dedicated SEI message instead. This change also supports modification of the syntax of the frame-field information to convey additional and clearer instructions to the display, such as the pairing of fields together or more values for frame repetition.

The sample-aspect ratio SEI message enables signaling different sample aspect ratios for different pictures within the same sequence, whereas the corresponding information contained in the VUI applies to the whole sequence. This may be relevant when using the reference picture resampling feature with scaling factors that cause different pictures of the same sequence to have different sample aspect ratios.

The subpicture level information SEI message provides information of levels for the subpicture sequences.

The DRAP indication SEI message is discussed below. The VSEI spec includes the DRAP indication SEI message, which is specified as follows:

| | Descriptor |
| --- | --- |
| dependent_rap_indication( payloadSize ) {<br>} | |

The picture associated with a dependent random access point (DRAP) indication SEI message is referred to as a DRAP picture. The presence of the DRAP indication SEI message indicates that the constraints on picture order and picture referencing specified in this clause apply. These constraints can enable a decoder to properly decode a DRAP picture and the pictures that follow the DRAP picture in both decoding order and output order without needing to decode any other pictures except the associated IRAP picture of the DRAP picture.

The constraints indicated by the presence of the DRAP indication SEI message, which shall all apply, are as follows. The DRAP picture is a trailing picture. The DRAP picture has a temporal sublayer identifier equal to 0. The DRAP picture does not include any pictures in the active entries of the DRAP picture's reference picture lists except the associated IRAP picture of the DRAP picture. Any picture that follows the DRAP picture in both decoding order and output order does not include, in the active entries of that picture's reference picture lists, any picture that precedes the DRAP picture in decoding order or output order, with the exception of the associated IRAP picture of the DRAP picture.

DRAP signaling in media files is discussed below. The ISOBMFF includes a signaling mechanism for DRAP based on sample groups as follows. A DRAP sample group is defined as follows. A DRAP sample is a sample after which all samples in decoding order can be correctly decoded if the closest initial sample preceding the DRAP sample is available for reference. The initial sample is a stream access point (SAP) sample of SAP type 1, 2, or 3 that is marked as such either by being a Sync sample or by the SAP sample group. For example, if the 32nd sample in a file is an initial sample comprising an I-picture, the 48th sample may comprise a P-picture and be marked as a member of the dependent random access point sample group. This indicates that random access can be performed at the 48th sample by first decoding the 32nd sample (ignoring samples 33-47) and then continuing to decode from the 48th sample.

A sample can be a member of the dependent random access point Sample Group (and hence called a DRAP sample) only if the following conditions are true. The DRAP sample references only the closest preceding initial sample. The DRAP sample and all samples following the DRAP sample in output order can be correctly decoded when starting decoding at the DRAP sample. This can occur after having decoded the closest preceding SAP sample of type 1, 2, or 3, which can be marked as such by being a sync sample or by the SAP sample group. DRAP samples can only be used in combination with SAP samples of type 1, 2, and 3. This is in order to enable the functionality of creating a decodable sequence of samples by concatenating the preceding SAP sample with the DRAP sample and the samples following the DRAP sample in output order. An example syntax for a DRAP sample group is as follows.

class VisualDRAPEntry( )
   extends VisualSampleGroupEntry('drap') {
     unsigned int(3) DRAP_type;
     unsigned int(29) reserved=0;
   }

An example semantics for a DRAP sample group is as follows. DRAP_type is a non-negative integer. When DRAP_type is in the range of 1 to 3, the DRAP_type indicates the SAP_type (as specified in Annex I) that the DRAP sample would have corresponded to, had the DRAP sample not depended on the closest preceding SAP. Other type values are reserved. Reserved shall be equal to 0. The semantics of this subclause only apply to sample group description entries with reserved equal to 0. Parsers shall allow and ignore sample group description entries with reserved greater than 0 when parsing this sample group.

A video coding approach based on cross RAP reference (CRR), also referred to as external decoding refresh (EDR) and/or type 2 DRAP, is discussed below. The basic idea of this video coding approach is as follows. Instead of coding random access points as intra coded IRAP pictures (except for the very first picture in the bitstream), the random access points are coded using inter prediction to circumvent the unavailability of the earlier pictures if the random access points are coded as IRAP pictures. The mechanism provides a limited number of the earlier pictures, typically representing different scenes of the video content, through a separate video bitstream, which can be referred to as an external stream and/or an external means. Such earlier pictures are referred to as the external pictures. Consequently, each external picture can be used for inter prediction referencing by pictures across the random access points. The coding efficiency gain comes from having random access points coded as inter predicted pictures and having more available reference pictures for pictures that follow EDR pictures in decoding order. A bitstream coded with such a video coding approach can be used in applications based on ISOBMFF and DASH as described below.

DASH content preparation operations are discussed below. A video content is encoded into one or more representations, each of which includes a particular spatial resolution, temporal resolution, and quality. Each representation of a video content is represented by a main stream, and possibly also an external stream. The main stream contains coded pictures that may or may not include EDR pictures. When at least one EDR picture is included in the main stream, the external stream is also present and contains external pictures. When no EDR picture is included in the main stream, the external stream is not present. Each main stream is carried in a Main Stream Representation (MSR). Each EDR picture in an MSR is the first picture of a segment.

Each external stream, when present, is carried in an External Stream Representation (ESR). For each segment in an MSR starting with an EDR picture, there is a segment in the corresponding ESR having the same segment start time derived from the MPD, the segment carrying the external pictures needed for decoding of that EDR picture and the subsequent pictures in decoding order in the bitstream carried in the MSR. The MSRs of the same video content are included in one Adaptation Set (AS). The ESRs of the same video content are included in one AS.

DASH streaming operations are discussed below. A client gets the MPD of the DASH Media Presentation, parses the MPD, selects an MSR, and determines the starting presentation time from which the content is to be consumed. The client requests segments of the MSR, starting from the segment containing the picture having presentation time equal to (or close enough to) the starting presentation time. If the first picture in the starting segment is an EDR picture, the corresponding segment (having the same segment start time derived from the MPD) in the associated ESR is also requested, preferably before requesting of the MSR segments. Otherwise, no segment of the associated ESR is requested.

When switching to a different MSR, the client requests segments of the switch-to MSR, starting from the first segment having a segment start time greater than that of the last requested segment of the switch-from MSR. If the first picture in the starting segment in the switch-to MSR is an EDR picture, the corresponding segment in the associated ESR is also requested, preferably before requesting of the MSR segments. Otherwise, no Segment of the associated ESR is requested.

When continuously operating at the same MSR (after decoding of the starting segment after a seeking or stream switching operation), no segment of the associated ESR is requested, including when requesting any segment starting with an EDR picture.

Signaling of Cross RAP referencing in video is discussed below. CRR can be signaled in an SEI message, named a type 2 DRAP indication SEI message, as follows. A type 2 DRAP indication SEI message syntax is as follows.

|  | Descriptor |
| --- | --- |
| type2_drap_indication( payloadSize ) { |  |
|   t2drap_rap_id_in_clvs | u(16) |
|   t2drap_reserved_zero_13bits | u(13) |
|   t2drap_num_ref_rap_pics_minus1 | u(3) |
|   for( i= 0; i <= t2drap_num_ref_rap_pics_minus1; i++) |  |
|     t2drap_ref_rap_id[ i ] | u(16) |
| } |  |

A type 2 DRAP indication SEI message semantics is as follows. The picture associated with a type 2 DRAP indication SEI message is referred to as a type 2 DRAP picture. Type 1 DRAP pictures (associated with a DRAP indication SEI message) and type 2 DRAP pictures are collectively referred to as DRAP pictures. The presence of the type 2 DRAP indication SEI message indicates that the constraints on picture order and picture referencing specified in this subclause apply. These constraints can enable a decoder to properly decode the type 2 DRAP picture and the pictures that are in the same layer and follow the type 2 DRAP picture in both decoding order and output order. This can be accomplished without needing to decode any other pictures in the same layer except the list of pictures referenceablePictures, which includes the list of IRAP or DRAP pictures in decoding order that are within the same CLVS and identified by the t2drap_ref_rap_id[i] syntax elements.

The constraints indicated by the presence of the type 2 DRAP indication SEI message, which shall all apply, are as follows. The type 2 DRAP picture is a trailing picture. The type 2 DRAP picture has a temporal sublayer identifier equal to 0. The type 2 DRAP picture does not include any pictures in the same layer in the active entries of the type 2 DRAP picture's reference picture lists except the referenceablePictures. Any picture that is in the same layer and follows the type 2 DRAP picture in both decoding order and output order does not include, in the active entries of the type 2 DRAP picture's reference picture lists, any picture that is in the same layer and precedes the type 2 DRAP picture in decoding order or output order, with the exception of the referenceablePictures. Any picture in the list referenceablePictures does not include, in the active entries of the picture's reference picture lists, any picture that is in the same layer and is not a picture at an earlier position in the list referenceablePictures. Consequently, the first picture in referenceablePictures, even when the picture is a DRAP picture instead of an IRAP picture, does not include any picture from the same layer in the active entries of the picture's reference picture lists.

t2drap_rap_id_in_clvs specifies the RAP picture identifier, denoted as RapPicId, of the type 2 DRAP picture. Each IRAP or DRAP picture is associated with a RapPicId. The value of RapPicId for an IRAP picture is inferred to be equal to 0. The values of RapPicId shall be different for any two IRAP or DRAP pictures within a CLVS. t2drap_reserved_zero_13bits shall be equal to 0 in bitstreams conforming to this version of this Specification. Other values for t2drap_reserved_zero_13bits are reserved. Decoders shall ignore the value of t2drap_reserved_zero_13bits.

t2drap_num_ref_rap_pics_minus1 plus 1 indicates the number of IRAP or DRAP pictures that are within the same CLVS as the type 2 DRAP picture and may be included in the active entries of the reference picture lists of the type 2 DRAP picture. t2drap_ref_rap_id[i] indicates RapPicId of the i-th IRAP or DRAP picture that is within the same CLVS as the type 2 DRAP picture and may be included in the active entries of the reference picture lists of the type 2 DRAP picture.

The following are examples of technical problems solved by the disclosed technical solutions. For example, the following problems exist regarding signaling of CRR and/or DRAP in video bitstreams and media files. The DRAP indication SEI message lacks a signaling that indicates whether pictures following a DRAP picture in decoding order but preceding the DRAP picture in output order can be correctly decoded when random accessing from the DRAP picture. Such pictures may be incorrectly decoded in this case because they refer to pictures earlier than the DRAP picture in decoding order for inter prediction.

Figure 5:
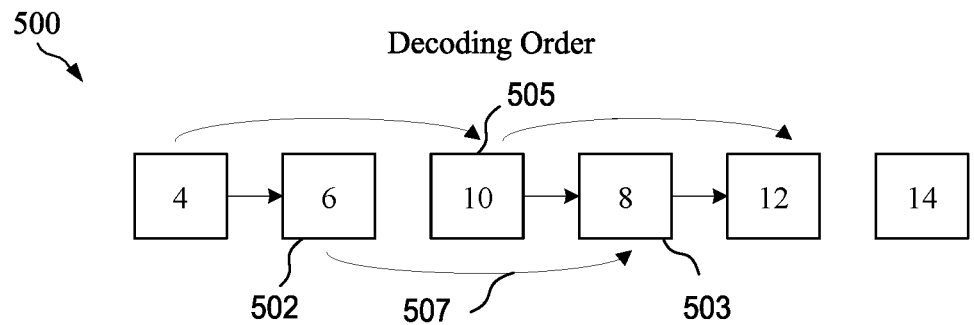
FIG. 5 is a schematic diagram that shows a potential decoding error when a picture follows a DRAP and/or CRR picture in decoding order and precedes the DRAP and/or CRR picture in output order.

Reference is made to FIG. 5, which shows an example of a picture that follows an associated DRAP picture in decoding order and precedes the associated DRAP picture in output order. Each box is a picture illustrated in decoding order from left to right. The number in a box is the output order, which is also known as a picture order count of the picture. An arrow indicates an inter prediction relationship between two pictures, with the picture on the right-hand side (at the arrowhead) using the picture on the left-hand side (at the arrow origin) as a reference picture.

In the example shown in FIG. 5, inter prediction from picture 6 to picture 8 can be turned off (the arrow collecting the two pictures is removed). In this case, when random accessing from the DRAP picture (picture 10), the picture 8 can be correctly decodable. However, when inter prediction from picture 6 to picture 8 is employed, picture 8 cannot be correctly decoded when the DRAP picture (picture 10) is used as a random access point. An indication of whether such inter prediction is turned off is useful for systems to know when to start presenting the video when random accessing from a DRAP picture. For example, with such an indication, when random accessing from the DRAP picture (picture 10), the application system would know whether the presentation can start from picture 8 or from picture 10.

The type 2 DRAP indication SEI message also lacks a signaling mechanism to indicate whether pictures following a type 2 DRAP picture in decoding order but preceding the type 2 DRAP picture in output order can be correctly decoded when random accessing from the type 2 DRAP picture. Such a picture may be incorrectly decoded in this case when the picture refers to pictures earlier than the type 2 DRAP picture in decoding order for inter prediction. Such an indication is useful for systems to determine when to start presenting the video when random accessing from a type 2 DRAP picture. A mechanism for signaling CRR in media files is also lacking.

Further, the semantics of the DRAP sample group in the ISOBMFF is faulty. ISOBMFF states that a DRAP sample is a sample after which all samples in decoding order can be correctly decoded if the closest initial sample preceding the DRAP sample is available for reference. However, even if the closest initial sample preceding the DRAP sample is available for reference, there is a case where samples following the DRAP sample in decoding order but preceding the DRAP sample in output order refer to pictures earlier than the pictures in the closest initial sample for reference. In such a case, such samples (pictures) cannot be correctly decoded.

Disclosed herein are mechanisms to address one or more of the problems listed above. For example, a DRAP picture is a random access point picture that is coded via inter prediction by reference to an IRAP picture. Further, a CRR picture, which is also known as a type 2 DRAP and/or an enhanced dependent random access point (EDRAP) picture, is a random access point picture that is coded via inter prediction by reference to an IRAP picture and is further permitted to reference one or more other dependent random access point pictures. Hence, CRR/DRAP/type 2 DRAP can be considered to be a type of DRAP. DRAP and CRR are designed based on the premise that video pictures are managed in a particular order. However, encoders are allowed to reorder pictures to increase coding efficiency. Accordingly, video pictures can have an output order and a decoding order. An output order is the order that pictures are presented/displayed and a decoding order is the order that the pictures are coded into a bitstream. Some DRAP and CRR designs do not consider this distinction, and hence errors can arise when video is coded using DRAP and/or CRR and the encoder determines to reorder the pictures. Specifically, an error can arise when an inter predicted picture follows a DRAP/CRR picture in decoding order and precedes the DRAP/CRR picture in output order. An error may occur because such a picture may be allowed to be coded by reference to a further picture that precedes the DRAP/CRR picture in decoding order. When the DRAP/CRR picture is used by the decoder as a random access point, the picture may or may not be completely decodable, depending on whether inter prediction by reference to the further picture is used. Further, various signaling mechanisms may not completely support DRAP and/or CRR.

Accordingly, the present disclosure includes a signaling mechanism to indicate whether an inter predicted picture following a DRAP/CRR picture in decoding order and preceding the DRAP/CRR picture in output order is allowed to reference other pictures prior to the DRAP/CRR picture. In an example, the signaling mechanism is a SEI message in the encoded bitstream. If such inter prediction referencing is allowed, the inter predicted picture is not displayed when the DRAP/CRR picture is used as a random access point. If such inter prediction referencing is prevented, the inter predicted picture can be displayed when the DRAP/CRR picture is used as a random access point. In addition, the present disclosure describes sample groups and/or sample entries that can be included in ISOBMFF media files to describe DRAP and/or CRR picture. This allows the decoder to determine the presence and location of DRAP and/or CRR pictures at the file format level.

To solve the above problems, and others, methods as summarized below are disclosed. The items should be considered as examples to explain the general concepts and should not be interpreted in a narrow way. Furthermore, these items can be applied individually or combined in any manner.

Example 1

In one example, an indication is added to the DRAP indication SEI message syntax to indicate whether the pictures in the same layer as the DRAP picture, following the DRAP picture in decoding order, and preceding the DRAP picture in output order are allowed to refer to a picture in the same layer and earlier than the DRAP picture in decoding order for inter prediction. If such a reference is prevented, the decoder can correctly decode and display such pictures when the DRAP is used as a random access point. When the reference is allowed, decoding may not be possible and such pictures should not be displayed at the decoder when the DRAP is used as a random access point. In one example, the indication is a one-bit flag. In one example, the flag is set equal to X (X being 1 or 0) to indicate that the pictures in the same layer and following the DRAP picture in decoding order but preceding the DRAP picture in output order are allowed to refer to a picture in the same layer and earlier than the DRAP picture in decoding order for inter prediction. In one example, the flag can be set equal to 1-X (X being 1 or 0) to indicate that the pictures in the same layer and following the DRAP picture in decoding order and preceding the DRAP picture in output order do not refer to a picture in the same layer and earlier than the DRAP picture in decoding order for inter prediction. In one example, the indication is a multi-bit indicator. In one example, a constraint requires that any picture in the same layer and following the DRAP picture in decoding order shall follow, in output order, any picture that is in the same layer and precedes the DRAP picture in decoding order.

Example 2

In one example, an additional SEI message is specified, and the presence of this SEI message indicates that the pictures in the same layer and following a DRAP picture in the bitstream in decoding order and preceding the DRAP picture in output order do not refer to a picture in the same layer and earlier than the DRAP picture in decoding order for inter prediction. In one example, the presence of this SEI message indicates that the pictures in the same layer and following a DRAP picture in the bitstream in decoding order and preceding the DRAP picture in output order are allowed to refer to a picture in the same layer and earlier than the DRAP picture in decoding order for inter prediction. In one example, a constraint requires that any picture that is in the same layer and follows the DRAP picture in decoding order shall follow, in output order, any picture that is in the same layer and precedes the DRAP picture in decoding order.

Example 3

In one example, an additional SEI message is specified. The presence of this additional SEI message indicates that the pictures in the same layer and following, in decoding order, the DRAP picture associated with both the SEI message and a DRAP indication SEI message, and preceding the DRAP picture in output order, do not refer to any picture that is in the same layer and positioned earlier than the DRAP picture in decoding order for inter prediction. In one example, the absence of this additional SEI message indicates that the pictures in the same layer that follow, in decoding order, the DRAP picture associated with both the additional SEI message and a DRAP indication SEI message, and precede the DRAP picture in output order, are allowed to refer to a picture in the same layer and earlier than the DRAP picture in decoding order for inter prediction. In one example, a constraint ensures that any picture in the same layer and following the DRAP picture in decoding order shall follow, in output order, any picture that is in the same layer and preceding the DRAP picture in decoding order.

Example 4

In one example, an additional SEI message is specified, and an indication is added to the additional SEI message syntax to indicate whether the pictures in the same layer and following, in decoding order, the DRAP picture associated with both the additional SEI message and a DRAP indication SEI message, and preceding the DRAP picture in output order are allowed to refer to a picture in the same layer and earlier than the DRAP picture in decoding order for inter prediction. In one example, the indication is a one-bit flag. In one example, the flag is set equal to X (X being 1 or 0) to indicate that the pictures in the same layer and following the DRAP picture in decoding order and preceding the DRAP picture in output order are allowed to refer to a picture in the same layer and earlier than the DRAP picture in decoding order for inter prediction. In one example, furthermore, the flag is set equal to 1-X (X being 1 or 0) to indicate that the pictures in the same layer and following a DRAP picture in decoding order and preceding the DRAP picture in output order do not refer to a picture in the same layer and earlier than the DRAP picture in decoding order for inter prediction. In one example, the indication is a multi-bit indicator. In one example, a constraint requires that any picture that is in the same layer and follows the DRAP picture in decoding order shall follow, in output order, any picture that is in the same layer and precedes the DRAP picture in decoding order.

Example 5

In one example, an indication is added to the type 2 DRAP indication SEI message syntax. The indication indicates whether the pictures in the same layer and following a type 2 DRAP picture in decoding order and preceding the type 2 DRAP picture in output order are allowed to refer to a picture in the same layer and earlier than the type 2 DRAP picture in decoding order for inter prediction. In one example, the indication is a one-bit flag. In one example, the flag is set equal to X (X being 1 or 0) to indicate that the pictures in the same layer and following the DRAP picture in decoding order and preceding the DRAP picture in output order are allowed to refer to a picture in the same layer and earlier than the DRAP picture in decoding order for inter prediction. In one example, furthermore, the flag is set equal to 1-X (X being 1 or 0) to indicate that the pictures in the same layer and following a DRAP picture in decoding order and preceding the DRAP picture in output order do not refer to a picture in the same layer and earlier than the DRAP picture in decoding order for inter prediction. In one example, the flag is added by reusing one bit from the t2drap_reserved_zero_13bits field in the type 2 DRAP indication SEI message syntax. In one example, the indication is a multi-bit indicator. In one example, a constraint requires that any picture that is in the same layer and follows the DRAP picture in decoding order shall follow, in output order, any picture that is in the same layer and precedes the DRAP picture in decoding order.

Example 6

In another example, an indication is associated with a DRAP or type 2 DRAP picture. In an example, the indication may be signaled for each DRAP or type 2 DRAP.

Example 7

In an example, an additional sample group is specified to signal CRR (e.g., samples containing type 2 DRAP pictures) in an ISOBMFF file.

Example 8

In an example, the DRAP sample group is extended to signal CRR (e.g., samples containing type 2 DRAP pictures) in an ISOBMFF file, for example by using the version field of the sample to group box (e.g., SampleToGroupBox or CompactSampleToGroupBox) or by using the grouping_type_parameter field (or part thereof) in the sample to group box.

Example 9

In one example, the DRAP sample entry includes a field indicative of the number of required random access point (RAP) samples needed for random accessing from a member of the DRAP sample group. The required RAP samples are either initial samples or DRAP samples. In one example, the DRAP sample entry further includes a field indicative of a RAP identifier of the members of a DRAP sample group. In one example, the field indicative of a RAP identifier is coded using 16 bits. In one example, the field indicative of a RAP identifier is coded using 32 bits. In one example, the DRAP sample entry excludes a field indicative of a RAP identifier of the members of a DRAP sample group. The RAP identifier can be signaled in the sub-sample information box, the sample auxiliary information size box, and/or another box. In one example, the DRAP sample entry excludes a field indicative of a RAP identifier of the members of a DRAP sample group. In an example, the RAP identifier is a sample number. In one example, the DRAP sample entry further includes a number of fields indicative of the RAP identifiers of the required RAP samples needed for random accessing from a member of the DRAP sample group. In one example, each of the fields indicative of the RAP identifiers of the required RAP samples is coded using 16 bits. In one example, each of the fields indicative of the RAP identifiers of the required RAP samples is coded using 32 bits. In one example, each of the fields indicative of the RAP identifiers of the required RAP samples directly represents the RAP identifier of a required RAP sample. In one example, each of the fields indicative of the RAP identifiers of the required RAP samples represents a difference between the RAP identifiers of two RAP samples. In one example, an i-th field (i equal to 0) of the fields indicative of the RAP identifiers of the required RAP samples represents a difference between the RAP identifier of a current sample (e.g., a sample of the current DRAP sample group) and the i-th RAP identifier of the first required RAP sample. In one example, an i-th field (i greater than 0) of the fields indicative of the RAP identifiers of the required RAP samples represents a difference between the RAP identifier of the (i−1)-th required RAP sample and the RAP identifier of the i-th required RAP sample. In one example, an i-th field (i greater than 0) of the fields indicative of the RAP identifiers of the required RAP samples represents a difference between the RAP identifier of the i-th required RAP sample and the RAP identifier of the (i−1)-th required RAP sample.

Example 10

In one example, a dependent random access point (DRAP) sample is a sample after which all samples in both decoding and output order can be correctly decoded when the closest initial sample preceding the DRAP sample is available for reference.

Below are some example embodiments for some of the aspects summarized above. The relevant parts that have been added or modified are denoted in underline bold and the deleted parts are denoted in bold italics.

In an example implementation, the syntax for the Type 2 DRAP indication SEI message are modified as follows.

|  | Descriptor |
|---|---|
| type2_drap_indication( payloadSize ) { |  |
|   t2drap_rap_id_in_clvs | u(16) |
|   t2drap_leading_pictures_decodable_flag | u(1) |
|   t2drap_reserved_zero_12bits | u(12) |
|   t2drap_num_ref_rap_pics_minus1 | u(3) |
|   for( i= 0; i <= t2drap_num_ref_rap_pics_minus1; i++) |  |
|     t2drap_ref_rap_id[ i ] | u(16) |
| } |  |

Further, the Type 2 DRAP indication SEI message semantics are modified as follows. The picture associated with a type 2 DRAP indication SEI message is referred to as a type 2 DRAP picture. Type 1 DRAP pictures (associated with a DRAP indication SEI message) and type 2 DRAP pictures are collectively referred to as DRAP pictures. The presence of the type 2 DRAP indication SEI message indicates that the constraints on picture order and picture referencing specified in this subclause apply. These constraints can enable a decoder to properly decode the type 2 DRAP picture and the pictures that are in the same layer and follow it in both decoding order and output order without needing to decode any other pictures in the same layer except the list of pictures referenceablePictures, which consists of the list of IRAP or DRAP pictures in decoding order that are within the same CLVS and identified by the t2drap_ref_rap_id[i] syntax elements.

The constraints indicated by the presence of the type 2 DRAP indication SEI message, which shall all apply, are as follows. The type 2 DRAP picture is a trailing picture. The type 2 DRAP picture has a temporal sublayer identifier equal to 0. The type 2 DRAP picture does not include any pictures in the same layer in the active entries of its reference picture lists except the referenceablePictures. Any picture that is in the same layer and follows the type 2 DRAP picture in both decoding order and output order does not include, in the active entries of its reference picture lists, any picture that is in the same layer and precedes the type 2 DRAP picture in decoding order or output order, with the exception of the referenceablePictures.

When t2drap_leading_pictures_decodable_flag is equal to 1, the following applies. Any picture that is in the same layer and follows the type 2 DRAP picture in decoding order shall follow, in output order, any picture that is in the same layer and precedes the type 2 DRAP picture in decoding order. Any picture that is in the same layer and follows the type 2 DRAP picture in decoding order and precedes the type 2 DRAP picture in output order does not include, in the active entries of its reference picture lists, any picture that is in the same layer and precedes the type 2 DRAP picture in decoding order, with the exception of the referenceablePictures.

Any picture in the list referenceablePictures does not include, in the active entries of its reference picture lists, any picture that is in the same layer and is not a picture at an earlier position in the list referenceablePictures. NOTE- Consequently, the first picture in referenceablePictures, even when it is a DRAP picture instead of an IRAP picture, does not include any picture from the same layer in the active entries of its reference picture lists.

t2drap_rap_id_in_clvs specifies the RAP picture identifier, denoted as RapPicId, of the type 2 DRAP picture. Each IRAP or DRAP picture is associated with a RapPicId. The value of RapPicId for an IRAP picture is inferred to be equal to 0. The values of RapPicId shall be different for any two IRAP or DRAP pictures within a CLVS. t2drap_reserved_zero_13bits shall be equal to 0 in bitstreams conforming to this version of this Specification. Other values for t2drap_reserved_zero_13bits are reserved for future use by ITU-T|ISO/IEC. Decoders shall ignore the value of t2drap_reserved_zero_13bits. t2drap_num_ref_rap_pics_minus1 plus 1 indicates the number of IRAP or DRAP pictures that are within the same CLVS as the type 2 DRAP picture and may be included in the active entries of the reference picture lists of the type 2 DRAP picture. t2drap_ref_rap_id[i] indicates RapPicId of the i-th IRAP or DRAP picture that is within the same CLVS as the type 2 DRAP picture and may be included in the active entries of the reference picture lists of the type 2 DRAP picture.

In an example implementation, a Dependent random access point (DRAP) sample group is defined as follows. When the grouping_type of the SampleToGroupBox or CompactSampleToGroupBox is equal to 'drap', the following applies. When the version field of the SampleToGroupBox or CompactSampleToGroupBox is equal to 0, or the field grouping_type_parameter exits and the value is equal to 0, a dependent random access point (DRAP) sample is a sample after which all samples in decoding order and in output order can be correctly decoded if the closest initial sample preceding the DRAP sample is available for reference. When the field grouping_type_parameter exists and the value is equal to 1, a DRAP sample is a sample after which all samples in decoding order and in output order can be correctly decoded if the closest initial sample preceding the DRAP sample and zero or more other identified DRAP samples earlier in decoding order than the DRAP sample are available for reference.

The initial sample is a SAP sample of SAP type 1, 2 or 3 that is marked as such either by being a Sync sample or by the SAP sample group. For example, if the 32nd sample in a file is an initial sample consisting of an I-picture, the 48th sample may consist of a P-picture and be marked as a member of the dependent random access point sample group, thereby indicating that random access can be performed at the 48th sample by first decoding the 32nd sample (ignoring samples 33-47) and then continuing to decode from the 48th sample. NOTE: DRAP samples can only be used in combination with SAP samples of type 1, 2 and 3. This is in order to enable the functionality of creating a decodable sequence of samples by concatenating the preceding SAP sample and zero or more other identified DRAP samples earlier in decoding order than the DRAP sample with the DRAP sample and the samples following the DRAP sample in output order.

When the version field of the SampleToGroupBox or CompactSampleToGroupBox is equal to 0, or the field grouping_type_parameter exits and the value is equal to 0, a sample can be a member of the dependent random access point Sample Group (and hence called a DRAP sample) only if the following conditions are true. The DRAP sample references only the closest preceding initial sample. The DRAP sample and all samples following the DRAP sample in decoding order and output order can be correctly decoded when starting decoding at the DRAP sample after having decoded the closest preceding SAP sample of type 1, 2 or 3 marked as such by being a Sync sample or by the SAP sample group.

When the field grouping_type_parameter exists and the value is equal to 1, a sample can be a member of the DRAP Sample Group (and hence called a DRAP sample) only if the following conditions are true. The DRAP sample references only the closest preceding initial sample and zero or more other identified DRAP samples earlier in decoding order than the DRAP sample. The DRAP sample and all samples following the DRAP sample in decoding order and output order can be correctly decoded when starting decoding at the DRAP sample after having decoded the closest preceding SAP sample of type 1, 2 or 3 marked as such by being a Sync sample or by the SAP sample group and after having decoded the zero or more other identified DRAP samples earlier in decoding order than the DRAP sample.

An example syntax for a DRAP sample group entry is as follows:
    class VisualDRAPEntry( )
    extends VisualSampleGroupEntry('drap') {
    unsigned int(3) DRAP_type;
    unsigned int(3) num_ref_rap_pics_minus1;
    unsigned int(10) reserved=0;
    unsigned int(16) RAP_id;
        for (i=0; i<=num_ref_rap_pics_minus1+1; i++)
        unsigned int(16) ref_RAP_id[i]
    }

An example semantics for a DRAP sample group entry is as follows. DRAP_type is a non-negative integer. When DRAP_type is in the range of 1 to 3 it indicates the SAP_type (as specified in Annex I) that the DRAP sample would have corresponded to, had it not depended on the closest preceding SAP or other DRAP samples. Other type values are reserved. num_ref_rap_pics_minus1 plus 1 indicates the number of initial sample or other DRAP samples that are earlier in decoding order than the DRAP sample and are needed for reference to be able to correctly decode the DRAP sample and all samples following the DRAP sample in both decoding and output order when starting decoding from the DRAP sample. reserved shall be equal to 0. The semantics of this subclause only apply to sample group description entries with reserved equal to 0. Parsers shall allow and ignore sample group description entries with reserved greater than 0 when parsing this sample group. RAP_id specifies the RAP sample identifier of the samples that belong to this sample group. A RAP sample is either an initial sample or a DRAP sample. The value of RAP_id for an initial sample is inferred to be equal to 0. ref_RAP_id[i] indicates the RAP_id of the i-th RAP sample that is earlier in decoding order than the DRAP sample and are needed for reference to be able to correctly decode the DRAP sample and all samples following the DRAP sample in both decoding and output order when starting decoding from the DRAP sample.

In another example implementation, the RAP_id field is not signaled in the VisualDRAPEntry( ) syntax, in which case the syntax VisualDRAPEntry( ) is as follows:
    class VisualDRAPEntry( )
    extends VisualSampleGroupEntry('drap') {
    unsigned int(3) DRAP_type;
    unsigned int(3) num_ref_rap_pics_minus1;
    unsigned int(26) reserved=0;
    unsigned int(16) RAP_id;
        for (i=0; i<=num_ref_rap_pics_minus1+1; i++)
        unsigned int(16) ref_RAP_id[i]
    }

Further, the RAP_id field for each DRAP sample is signaled in the sub-sample information box, the sample auxiliary information size box, or an additional box.

In another example implementation, the ref_RAP_id[i] field is changed to ref_RAP_id_delta[i], and the semantics of the ref_RAP_id[i] field are changed as follows. ref_RAP_id_delta[i] indicates a delta of the RAP_id of the i-th RAP sample that is earlier in decoding order than the DRAP sample and are needed for reference to be able to correctly decode the DRAP sample and all samples following the DRAP sample in both decoding and output order when starting decoding from the DRAP sample. The variable RefRapId[i], representing the RAP_id of the i-th RAP sample, is derived as follows, where RAP_id is the RAP_id of a current sample (i.e., a sample of the current DRAP sample group):
    if (i==0)
        RefRapId[i]=RAP_id-ref_RAP_id_delta[i]
    else
        RefRapId[i]=RefRapId[i−1]−ref_RAP_id_delta[i]

In another example implementation, the semantics of the ref_RAP_id_delta[i] field are changed as follows. ref_RAP_id_delta[i] indicates a delta of the RAP_id of the i-th RAP sample that is earlier in decoding order than the DRAP sample and are needed for reference to be able to correctly decode the DRAP sample and all samples following the DRAP sample in both decoding and output order when starting decoding from the DRAP sample. The variable RefRapId[i], representing the RAP_id of the i-th RAP sample, is derived as follows, where RAP_id is the RAP_id of a current sample (i.e., a sample of the current DRAP sample group):
    if (i==0)
        RefRapId[i]=RAP_id-ref_RAP_id_delta[i]
    else
        RefRapId[i]=RefRapId[i−1]+ref_RAP_id_delta[i]

In another example implementation, the RAP sample identifier of a RAP sample is specified to be equal to the sample number of the RAP sample, RAP_Id of a current sample is the sample number of a current sample, and variable RefRapId[i] represents the sample number of the i-th RAP sample.

In another example implementation, the RAP_id field, when present in the sample group description, and the ref_RAP_id[i] field are coded using 32 bits.

FIG. 1 is a schematic diagram of an example mechanism for random access when decoding a bitstream using IRAP pictures. Specifically, FIG. 1 illustrates a bitstream 100 including IRAP pictures 101 and non-IRAP pictures 103. An IRAP picture 101 is a picture that is coded according to intra prediction and that can be used as an access point into the bitstream 100. Intra prediction is a process that codes blocks of a picture by reference to other blocks in the same picture. A picture coded according to intra prediction can be decoded without reference to other pictures. In contrast, a non-IRAP picture 103 is a picture that cannot be used as an access point and can be decoded after an associated IRAP picture 101 is decoded. For example, a non-IRAP picture 103 is generally coded according to inter prediction. Inter prediction is a process that codes blocks of a picture by reference to blocks of other pictures, which are designated as reference pictures. A picture coded based on inter prediction can only be correctly decoded if all of that picture's reference pictures are also decoded. Both IRAP pictures 101 and non-IRAP pictures 103 can be designated as reference pictures for other non-IRAP pictures 103.

Depending on the coding technology, various types of IRAP pictures 101 can be used. In the present example, the IRAP pictures 101 include IDR pictures and CRA pictures. An IDR picture is an intra coded picture that can be used as a first picture in a coded video sequence. A CRA picture is an intra coded picture that allows for the use of associated leading pictures. A leading picture is a picture that precedes an associated IRAP picture 101 in output order but follows the IRAP picture 101 in decoding order. A decoder can begin decoding at the start of a bitstream 100. However, users often wish to jump to a particular point in a bitstream and begin watching from the selected point. Any point that can be selected by a user as a starting point for decoding is known as a random access point.

Generally, any IRAP picture 101 can be used as a random access point. Once an IRAP picture 101 is selected as a random access point, all associated non-IRAP pictures 103 (e.g., following the selected IRAP picture 101) can also be decoded. In the example shown, a user has selected CRA4 for random access. The decoder can begin decoding at CRA4 without decoding any pictures prior to CRA4. This is because pictures following an IRAP pictures are generally prevented from referencing earlier IRAP pictures. Accordingly, once CRA4 is selected as a random access point, the decoder can decode CRA4 for display and then decode non-IRAP pictures 103 following CRA4 based on CRA4. This allows the decoder to begin presenting the bitstream from the random access point (e.g., CRA4) without decoding pictures prior to the random access point.

Figure 2:
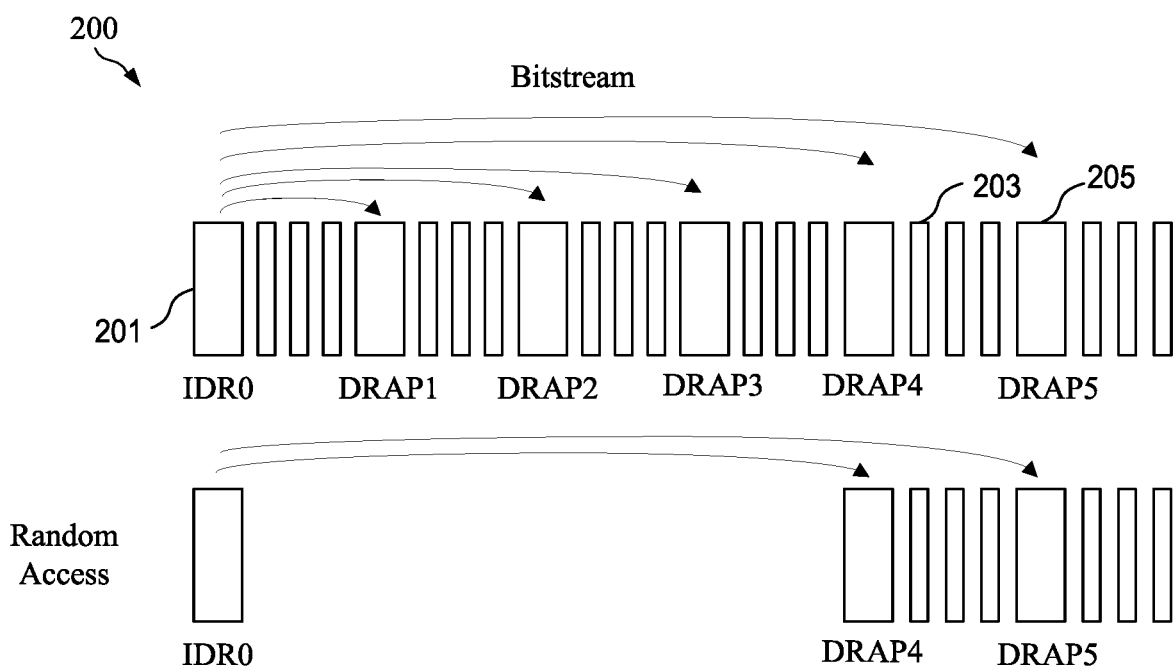
FIG. 2 is a schematic diagram of an example mechanism for random access when decoding a bitstream using DRAP pictures.

FIG. 2 is a schematic diagram of an example mechanism for random access when decoding a bitstream using DRAP pictures. Specifically, FIG. 2 illustrates a bitstream 200 including an IRAP picture 201, non-IRAP pictures 203, and DRAP pictures 205. IRAP picture 201 and non-IRAP pictures 203 may be substantially similar to IRAP pictures 101 and non-IRAP pictures 103, respectively. In the present example, an IDR picture is used as an IRAP picture 201.

DRAP pictures 205 are also included. A DRAP picture 205 is a picture that is coded according to inter prediction and that can be used as an access point into the bitstream 200. For example, each DRAP picture 205 can be coded by reference to the IRAP picture 201. FIG. 2 includes arrows that point to a picture that is coded according to inter prediction and from an associated reference picture. As shown, each DRAP picture 205 is coded by reference to IDR0. As such, any DRAP picture 205 can be used as a random access point as long as the decoder can decode the associated IRAP picture 201. In the example shown, DRAP4 has been selected as the random access point. The decoder should be made aware that DRAP pictures 205 are used in the bitstream 200 and made aware of the IRAP picture(s) 201 used as reference pictures for the DRAP pictures 205, for example via signaling. The decoder can then decode IDR0 for use in random access and decode DRAP4 based on IDR0. The decoder can then decode the non-IRAP pictures 203 following DRAP4 based on DRAP4. The decoder can begin presenting the decoded video at DRAP4.

Pictures coded according to inter prediction are more compressed than pictures coded according to intra prediction. Accordingly, DRAP pictures 205 are more compressed than IRAP pictures 101 in bitstream 100. Accordingly, the usage of DRAP pictures 205 reduces the amount of data over time (e.g., bitrate) signaled for bitstream 200 relative to bitstream 100 at the cost of a more complicated signaling mechanism and decoding procedure.

Figure 3:
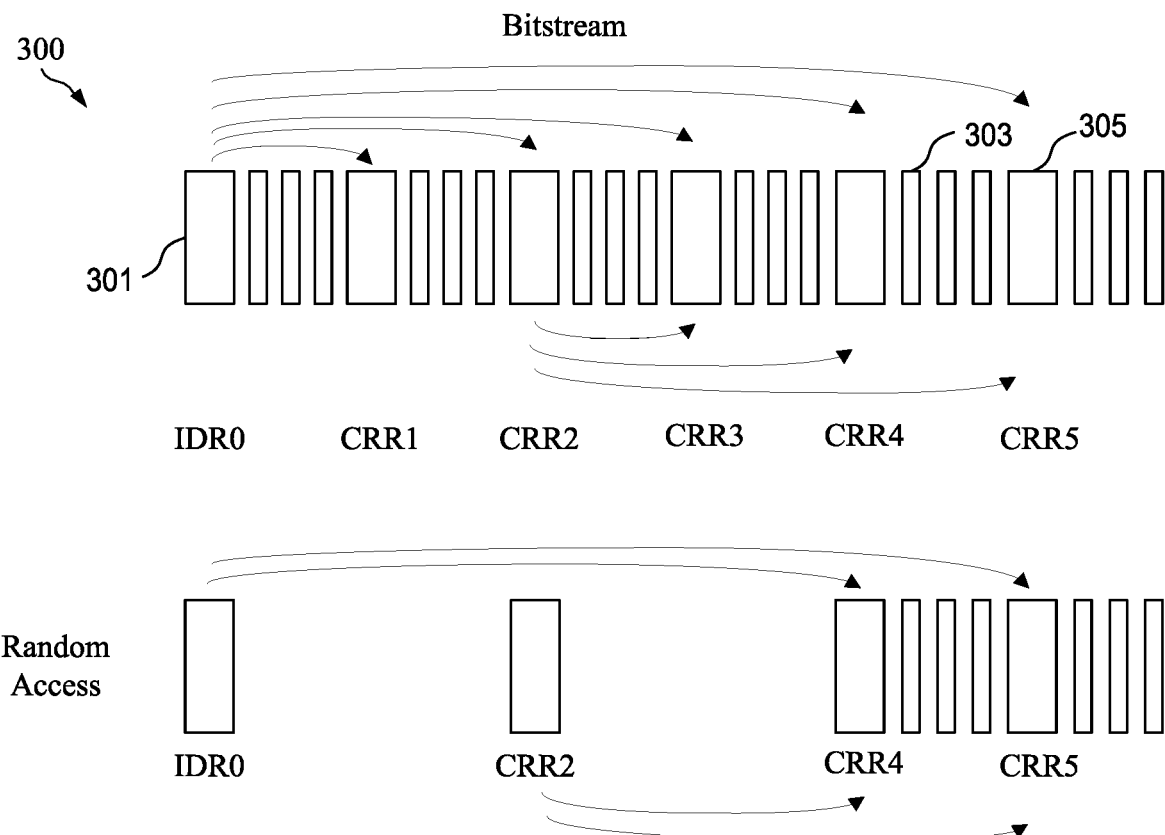
FIG. 3 is a schematic diagram of an example mechanism for random access when decoding a bitstream using CRR pictures.

FIG. 3 is a schematic diagram of an example mechanism for random access when decoding a bitstream using CRR pictures. Specifically, FIG. 3 illustrates a bitstream 300 including an IRAP picture 301, non-IRAP pictures 303, and CRR pictures 305. IRAP picture 301 and non-IRAP pictures 303 may be substantially similar to IRAP pictures 101 and non-IRAP pictures 103, respectively. A CRR picture 305 is a picture that is coded according to inter prediction and that can be used as an access point into the bitstream 300. A CRR picture 305 may be considered to be a type of DRAP picture. While a DRAP picture is coded by reference to an IRAP picture, a CRR picture 305 can be coded by reference to both an IRAP picture 301 and any other CRR picture 305. Because a CRR picture 305 is a type of DRAP picture, CRR pictures 305 may also be known as EDRAP pictures and/or type 2 DRAP pictures, and such terms can be used interchangeably. FIG. 3 includes arrows that point to a picture that is coded according to inter prediction and from an associated reference picture.

In the example shown, all the CRR pictures 305 are coded by reference to the IRAP picture 301 denoted as IDR0. Further, CRR3, CRR4, and CRR5 are also coded by reference to CRR2. Accordingly, any CRR picture 305 can be used as a random access point as long as the decoder can decode the associated IRAP picture 301 and any associated CRR picture 305 used as a reference picture. In the example shown, CRR4 has been selected as the random access point. The decoder should be made aware that CRR pictures 305 are used in the bitstream 300 and made aware of the IRAP picture(s) 301 and CRR pictures 305 used as reference pictures for other CRR pictures 305, for example via signaling. The decoder can then decode IDR0 and CRR2 for use in random access and decode CRR4 based on IDR0 and CRR2. The decoder can then decode the non-IRAP pictures 303 following CRR4 based on CRR4. The decoder can begin presenting the decoded video at CRR4.

Inter prediction operates by matching blocks in a picture with similar reference blocks in reference picture(s). The encoder can then encode a motion vector that points to a reference block instead of encoding the current block. Any difference between the current block and the reference block is encoded as a residual. The more closely the current block matches the reference block, the less residual is encoded. As such, a better match between the current block and the reference block results in less coded data and better compression. The benefit of CRR over DRAP is that more pictures are available for use, which results in better matches and better compression. The cost if CRR over DRAP is increased complexity in signaling and decoding.

Figure 4:
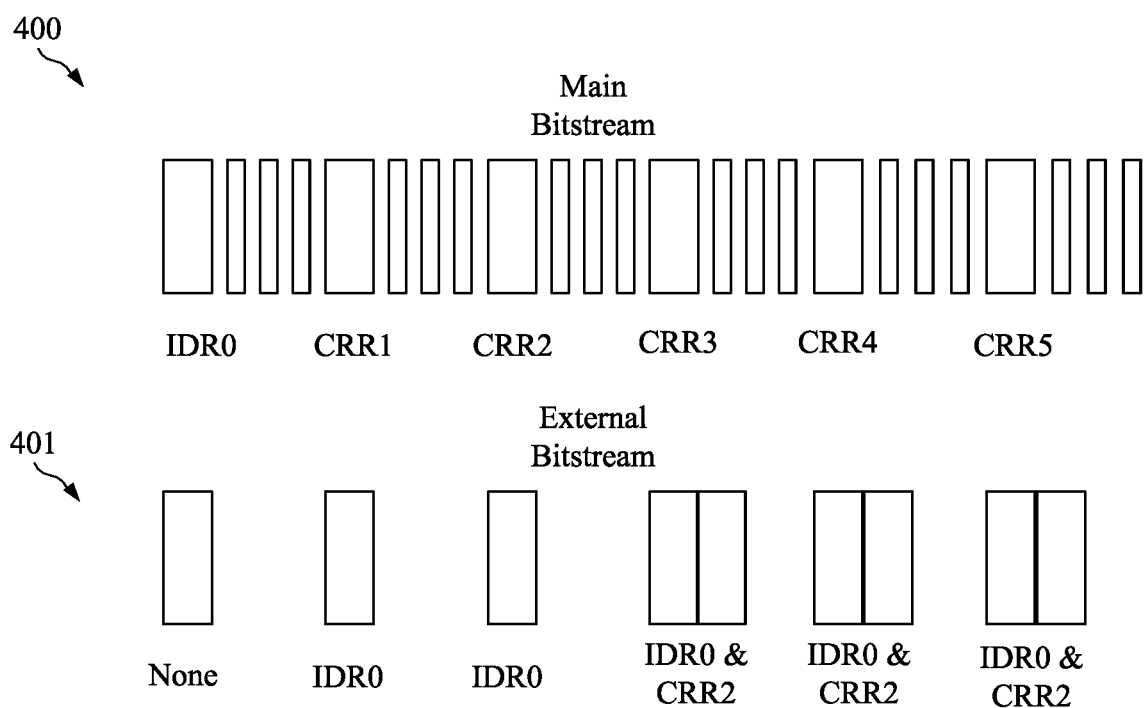
FIG. 4 is a schematic diagram of an example mechanism for signaling an external bitstream to support CRR based random access.

FIG. 4 is a schematic diagram of an example mechanism for signaling an external bitstream 401 to support CRR based random access. As shown above, managing reference pictures for CRR is more complicated than managing reference pictures for DRAP. FIG. 4 illustrates a main bitstream 400 that contains the encoded video for decoding by a decoder. The main bitstream 400 is substantially similar to bitstream 300 with references omitted for simplicity. The external bitstream 401 is included to support random access. Specifically, the external bitstream 401 includes a set of reference pictures corresponding to each CRR picture. When random access occurs, the encoder and/or video server can transmit the main bitstream 400 starting at the access point and the portion of the external bitstream 401 that corresponds with the access point. For example, a user could select CRR3 for random access. The decoder can then request the main bitstream 400 starting at CRR3. The encoder/video server can then begin transmitting the main bitstream 400 at CRR3. The encoder/video server can also transmit the portion of the external bitstream 401 that corresponds to the random access point. In this example, the encoder/video server would transmit IDR0 and CRR2. In this way, the decoder receives both the CRR picture at the random access point and all reference pictures needed to decode that CRR picture. The decoder can then decoder CRR3 and begin displaying the video from that point. In order to reduce data transmission, the encoder/video server may only send the portion of the external bitstream 401 needed to decode the random access point and may not send further data unless random access occurs again and/or unless subsequent CRR pictures employ reference pictures that are not provided at the current random access point.

FIG. 5 is a schematic diagram 500 that shows a potential decoding error when a picture follows a DRAP and/or CRR picture in decoding order and precedes the DRAP and/or CRR picture in output order. As with previous figures, arrows represent inter prediction with the arrow pointing to an inter predicted picture and the arrow pointing away from an associated reference picture.

Encoders are allowed to reorder pictures to increase compression. As such, the order in which pictures should be presented to the user is known as output order. The order in which pictures are coded into the bitstream is known as the decoding order. Pictures can be identified by a picture order count. A picture order count can be any value in ascending order that uniquely identifies a picture. In diagram 500, the pictures are illustrated in decoding order. Meanwhile, the pictures are numbered based on their picture order count, which increases in output order. As can be seen by the picture order counts, picture 8 has been moved out of output order and follows picture 10, which is a random access point. Accordingly, picture 8 is an inter predicted picture 503 that precedes a random access point in output order and follows the random access point in decoding order. In the present example, picture 10 is a DRAP/CRR picture 505, which can be either a DRAP picture or a CRR/EDRAP/type 2 DRAP picture, depending on the example. In the present example, the inter predicted picture 503 is coded via inter prediction by reference 507 to picture 6. Therefore, picture 6 is a reference picture 502 for the inter predicted picture 503.

Diagram 500 illustrates a potential coding error because inter predicted picture 503 references 507 reference picture 502 via inter prediction. Specifically, inter predicted picture 503 follows the DRAP/CRR picture 505 in decoding order, precedes DRAP/CRR picture 505 in output order, and references 507 a reference picture 502 positioned prior to the DRAP/CRR picture 505 in decoding order. When the bitstream is decoded from picture 4, which is an IRAP picture of type IDR, the reference picture 502 is decoded and saved in the reference picture buffer, and therefore inter predicted picture 503 can be properly decoded. However, when a DRAP/CRR picture 505 is used for random access, the reference picture 502 is skipped and is not decoded. Accordingly, inter predicted picture 503 cannot be correctly decoded when the inter predicted picture 503 references the reference picture 502. The encoder has the option of disallowing reference 507. For example, the encoder may limit all inter predicted pictures 503 to reference only the picture at the associated random access point and pictures following the associated access point in decoding order. If reference 507 is prevented, inter predicted picture 503 can always be decoded because the inter predicted picture 503 is not allowed to reference any picture prior to DRAP/CRR picture 505. However, if reference 507 is allowed, the inter predicted picture 503 cannot be directly decoded when the encoder decides to encode the inter predicted picture 503 by reference 507 to the reference picture 502. It should be noted allowing reference 507 does not always cause an error, because the encoder is not required to use reference 507. But if reference 507 is allowed, an error occurs any time reference 507 is selected and then DRAP/CRR picture 505 is used for random access. This can result in seemingly random errors from the user's perspective, which decreases user experience.

The present disclosure includes several mechanisms to address this problem. For example, the encoder can signal to the decoder whether reference 507 is allowed. When reference 507 is allowed, the decoder should not display inter predicted pictures 503 that precede the DRAP/CRR pictures 505 in output order and follow the DRAP/CRR picture 505 in decoding order when the DRAP/CRR picture 505 is used for random access because the inter predicted picture 503 may or may not be decodable (depending on whether the encoder chose to use reference 507). When reference 507 is prevented, the decoder should display inter predicted pictures 503 associated with DRAP/CRR pictures 505 when the DRAP/CRR picture 505 is used for random access. Further, DRAP and CRR signaling mechanisms are not fully specified. Accordingly, the present disclosure includes mechanisms to signal descriptions of DRAP and CRR usage in a media files for more efficient decoding of DRAP/CRR pictures 505 and/or associated pictures after random access by a decoder.

In another example, the coding process can be constrained to prevent reference 507 from occurring. For example, pictures may be separated into layers, and each layer may be associated with a different frame rate. This allows a decoder to select a layer with a frame rate that the decoder can support. The decoder then displays all pictures in the selected layer and all pictures in layers below the selected layer to achieve the desired frame rate. The error shown in diagram 500 can be prevented when the encoder requires that any picture (e.g., inter predicted picture 503) in a same layer as a DRAP/CRR picture 505 and that follows the DRAP/CRR picture 505 in decoding order shall follow in output order any picture that is in the same layer and precedes the DRAP/CRR picture 505 in decoding order.

Figure 6:
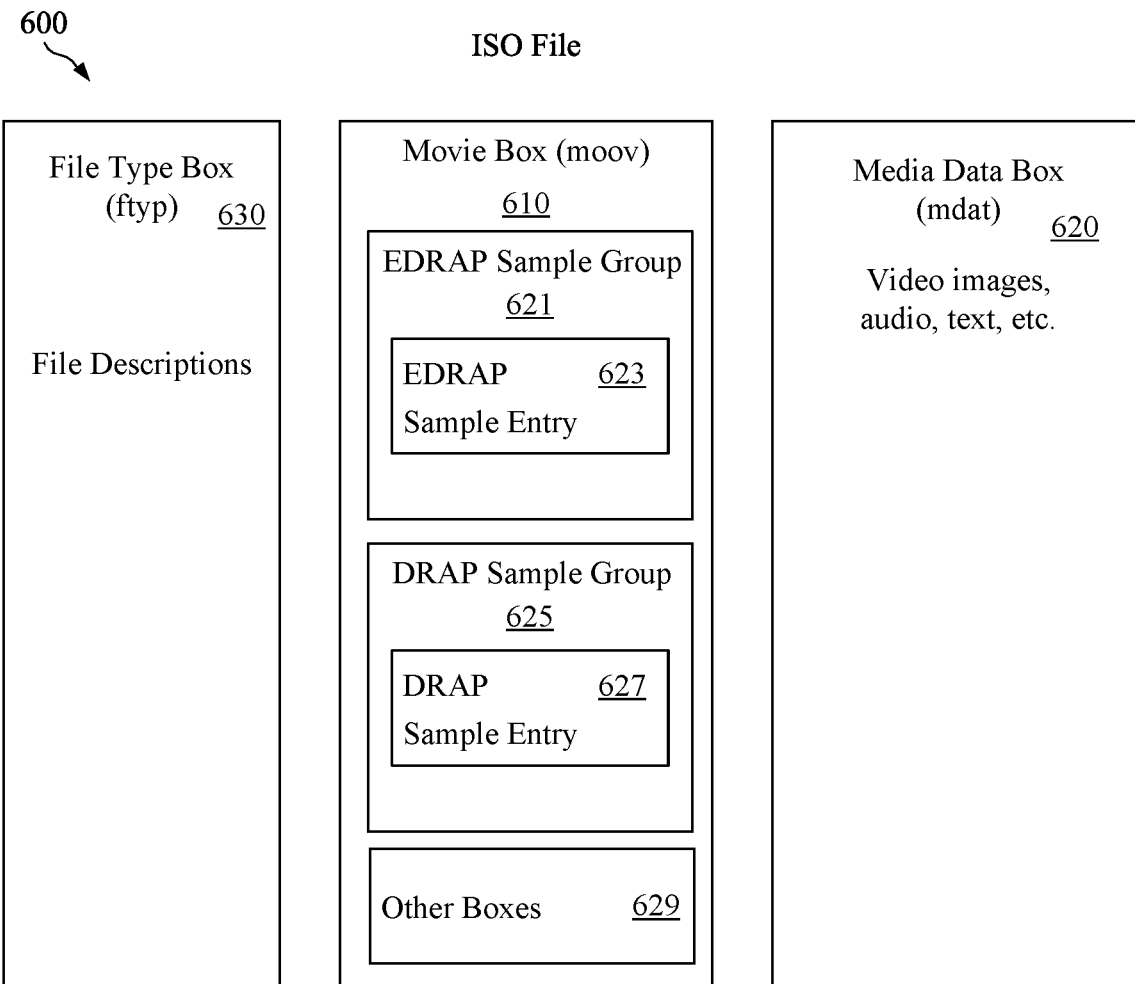
FIG. 6 is a schematic diagram of a media file stored in International Organization for Standardization (ISO) base media file format (ISOBMFF).

FIG. 6 is a schematic diagram of a media file 600 stored in ISOBMFF. For example, a media file 600 can be stored in ISOBMFF and used as a DASH representation. An ISOBMFF media file 600 is stored in a plurality of boxes that carry objects and/or data associated with a media content or a media presentation. For example, media file 600 may comprise a file type box (e.g. ftyp) 630, a movie box (e.g. moov) 610, and a media data box (e.g. mdat) 620.

A file type box 630 may carry data that describes the entire file, and hence may carry file level data. Accordingly, a file-level box is any box that contains data relevant to the entire media file 600. For example, the file type box 630 may comprise a file type that indicates a version number of an ISO specification and/or compatibility information of the media file 600. A movie box 610 may carry data that describes a movie contained in the media file, and hence may carry movie-level data. A move-level box is any box that contains data that describes an entire movie contained in the media file 600. A movie box 610 can contain a wide range of sub-boxes that are used to contain data for various uses. For example, the movie box 610 contains track boxes (trak) that carry metadata describing a track of a media presentation. It should be noted that a track may be referred to as a timed sequence of related samples. For example, a media track may comprise a sequence of pictures or sampled audio, whereas a metadata track may comprise a sequence of metadata that corresponds to the pictures and/or audio. Data that describes a track is track-level data, and hence any box that describes a track is a track-level box.

A media data box 620 comprises interleaved and time-ordered media data (e.g. coded video pictures and/or audio) of the media presentation. For example, the media data box 620 may comprise a bitstream of video data coded according to VVC, AVC, HEVC, etc. A media data box 620 may include video pictures, audio, text, or other media data for display to the user. In ISOBMFF, pictures, audio, and text are collectively referred to as samples. This is in contrast to terminology used in video coding standards, which refers to pixels to be encoded/decoded as samples. As such, the word sample can refer to an entire picture (at the file format level) or to a group of pixels (at the bitstream level) depending on context.

As noted above, the present disclosure provides additional mechanisms to signal DRAP and/or CRR usage at the file format level. This allows a decoder to be aware of the DRAP and/or CRR usage by loading parameters in the moov box 610 prior to actually decoding the bitstream(s) of samples contained in the mdat box 620. For example, the moov box 610 can contain a DRAP sample group box 625 and/or an EDRAP sample group box 621. A sample group box can describe which samples are of a type corresponding with the sample group box. In one example, both DRAP and CRR are described in the DRAP sample group box 625, for example by treating CRR as a sub-type of DRAP. In another example, CRR samples are described by the EDRAP sample group box 621 and DRAP samples are described by the DRAP sample group box 625, respectively. In an example, the DRAP sample group 625 can contain DRAP sample entries 627. Each DRAP sample entries 627 can then describe an associated sample that has been coded according to DRAP. In an example, the EDRAP sample group 621 can contain EDRAP sample entries 623. Each EDRAP sample entries 623 can then describe an associated sample that has been coded according to CRR/EDRAP/type 2 DRAP. The descriptions of each DRAP/CRR sample can include a sample identifier of the picture, an identifier of samples containing associated reference picture(s), an indication of a number of samples and/or RAP samples needed to perform a random access from the picture, and/or additional information that is helpful to the decoder when selecting and performing random access at a DRAP/CRR picture.

The moov box 610 may also contain a wide range of other boxes 629. In some examples, the descriptions of the DRAP/CRR samples can be included in one or more of the other boxes 629. For example, the other boxes 629 may include a sample to group box (SampleToGroupBox), and DRAP and/or CRR samples can be described in the SampleToGroupBox. In another example, the other boxes 629 may include a compact sample to group box (CompactSampleToGroupBox), and DRAP and/or CRR samples can be described in the CompactSampleToGroupBox. As a specific example, the DRAP and/or CRR samples can be described in a group type parameter (group_type_parameter) field in the SampleToGroupBox and/or the CompactSampleToGroupBox. In another example, the other boxes 629 may include a sub-sample information box and DRAP and/or CRR samples can be described in the sub-sample information box. In another example, the other boxes 629 may include a sample auxiliary information size box and DRAP and/or CRR samples can be described in the sample auxiliary information size box. Further, any other box described herein may also be included in other boxes 629, and may include a description of DRAP and/or CRR samples.

Figure 7:
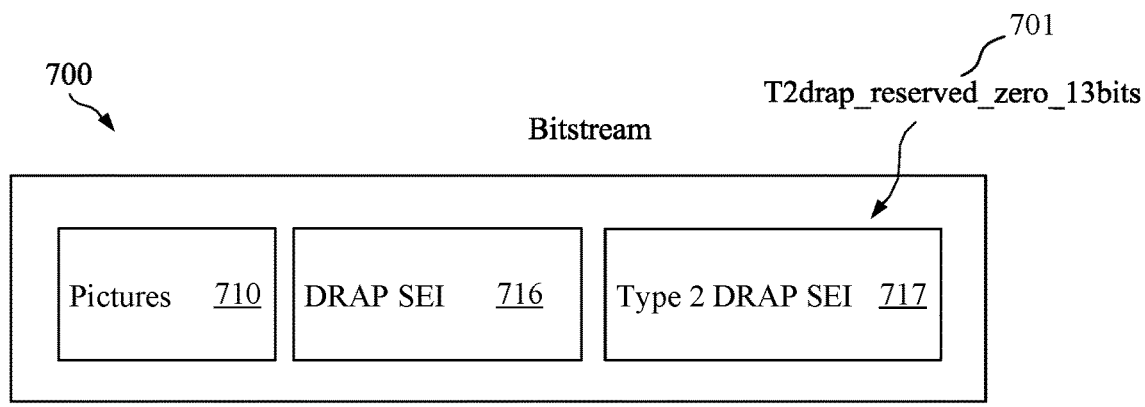
FIG. 7 is a schematic diagram of a bitstream containing encoded visual media data.

FIG. 7 is a schematic diagram of a bitstream 700 containing encoded visual media data. A bitstream 700 contains media data that has been coded/compressed by an encoder for decoding/decompression by a decoder. For example, a bitstream 700 may be included in a media data box 620 of an ISOBMFF media file 600. Further, a bitstream 700 may be included in a representation in DASH. A bitstream 700 can be coded according to various coding formats, such as VVC, AVC, EVC, HEVC, etc. In some coding formats, the bitstream 700 is expressed as a series of NAL units. A NAL unit is a unit of data sized to be positioned in a data packet. For example, VVC contains many types of NAL units. A bitstream 700 can contain video coding layer (VCL) NAL units that contain video data and non-VCL NAL units that contain data describing the VCL NAL units, describing the coding tools employed, describing the coding constraints, etc. In an example, a bitstream 700 can include pictures 710 that are coded in VCL NAL units. The pictures 710 can be IRAP pictures, inter predicted pictures, DRAP pictures, CRR pictures, etc. The non-VCL NAL units may contain various messages and parameter sets that describe the mechanisms used to code the pictures 710. While many VCL NAL units are included in VVC, the present disclosure focuses on SEI NAL units. For example, a SEI NAL unit can include a SEI message. A SEI NAL message contains data that assists processes related to decoding, display, or other purposes, but is not needed by the decoding process to determine sample values in decoded pictures. In an example, the SEI messages can include a DRAP indication SEI message 716 and/or a Type 2 DRAP indication SEI message 717. A DRAP indication SEI message 716 is a SEI message that contains data describing the usage of DRAP pictures. A Type 2 DRAP indication SEI message 717 is a SEI message that contains data describing the usage of CRR/EDRAP/type 2 DRAP pictures. The DRAP indication SEI message 716 and/or the Type 2 DRAP indication SEI message 717 can be associated with a DRAP and/or a CRR/EDRAP/type 2 DRAP picture and can indicate how such pictures should be treated during decoding.

In an example, a DRAP indication SEI message 716 can contain an indication of whether a picture following a DRAP picture in decoding order and preceding the DRAP picture in output order is permitted to refer to a reference picture positioned prior to the DRAP picture in decoding order for inter prediction. In an example, the DRAP indication SEI message 716 can contain an indication of whether a picture following a CRR/EDRAP/type 2 DRAP picture in decoding order and preceding the DRAP picture in output order is permitted to refer to a reference picture positioned prior to the DRAP picture in decoding order for inter prediction. In an example, the Type 2 DRAP indication SEI message 717 can contain an indication of whether a picture following a CRR/EDRAP/type 2 DRAP picture in decoding order and preceding the DRAP picture in output order is permitted to refer to a reference picture positioned prior to the DRAP picture in decoding order for inter prediction. Accordingly, the decoder can read the DRAP indication SEI message 716 and/or the Type 2 DRAP indication SEI message 717, depending on the example, and determine whether pictures following a DRAP/CRR picture in decoding order and preceding the DRAP/CRR picture in output order should be presented when the DRAP/CRR picture is used as a random access point.

In a specific example, the DRAP indication SEI message 716 can be associated with a DRAP picture and the Type 2

DRAP indication SEI message 717 can be associated with a CRR/EDRAP/type 2 DRAP picture. In a further example, the Type 2 DRAP indication SEI message 717 can contain a T2drap_reserved_zero_13bits field 701, and a bit from the T2drap_reserved_zero_13bits field 701 can be used to indicate whether a picture following a CRR/EDRAP/type 2 DRAP picture in decoding order and preceding the DRAP picture in output order is permitted to refer to a reference picture positioned prior to the DRAP picture in decoding order for inter prediction. In another example, a field in the DRAP indication SEI message 716 can contain a similar indication for a DRAP picture. In other examples, a multibit indicator in the DRAP indication SEI message 716 and/or the Type 2 DRAP indication SEI message 717 can be used for this purpose.

Figure 8:
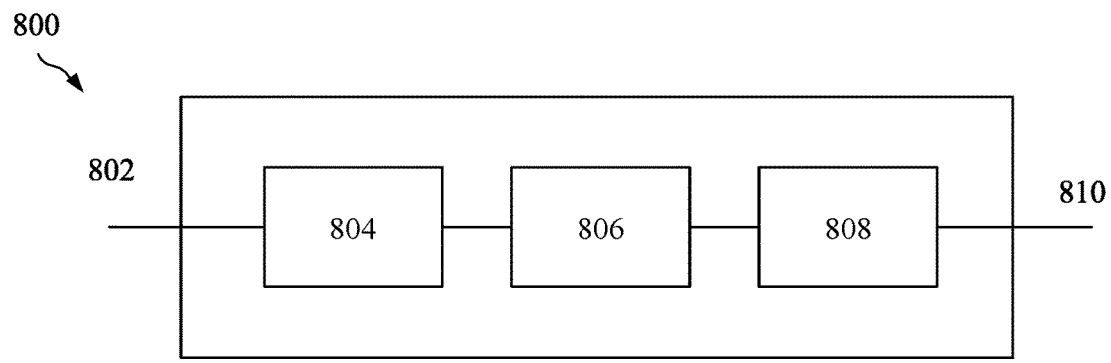
FIG. 8 is a block diagram showing an example video processing system.

FIG. 8 is a block diagram showing an example video processing system 800 in which various techniques disclosed herein may be implemented. Various implementations may include some or all of the components of the system 800. The system 800 may include input 802 for receiving video content. The video content may be received in a raw or uncompressed format, e.g., 8 or 10 bit multicomponent pixel values, or may be in a compressed or encoded format. The input 802 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 800 may include a coding component 804 that may implement the various coding or encoding methods described in the present document. The coding component 804 may reduce the average bitrate of video from the input 802 to the output of the coding component 804 to produce a coded representation of the video. The coding techniques are therefore sometimes called video compression or video transcoding techniques. The output of the coding component 804 may be either stored, or transmitted via a communication connected, as represented by the component 806. The stored or communicated bitstream (or coded) representation of the video received at the input 802 may be used by a component 808 for generating pixel values or displayable video that is sent to a display interface 810. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 9:
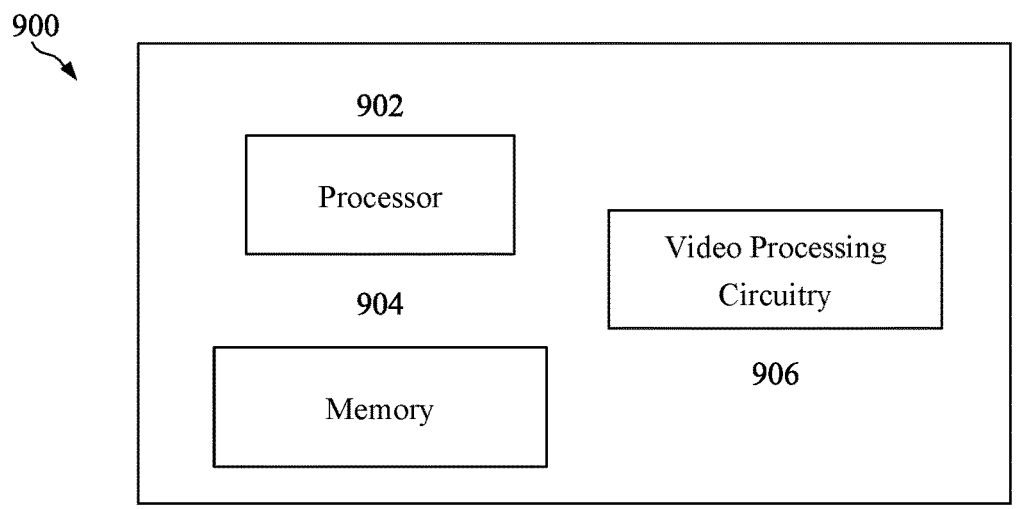
FIG. 9 is a block diagram of an example video processing apparatus.

FIG. 9 is a block diagram of an example video processing apparatus 900. The apparatus 900 may be used to implement one or more of the methods described herein. The apparatus 900 may be embodied in a smartphone, tablet, computer, Internet of Things (IoT) receiver, and so on. The apparatus 900 may include one or more processors 902, one or more memories 904 and video processing hardware 906. The processor(s) 902 may be configured to implement one or more methods described in the present document. The memory (memories) 904 may be used for storing data and code used for implementing the methods and techniques described herein. The video processing hardware 906 may be used to implement, in hardware circuitry, some techniques described in the present document. In some embodiments, the video processing hardware 906 may be at least partly included in the processor 902, e.g., a graphics co-processor.

Figure 10:
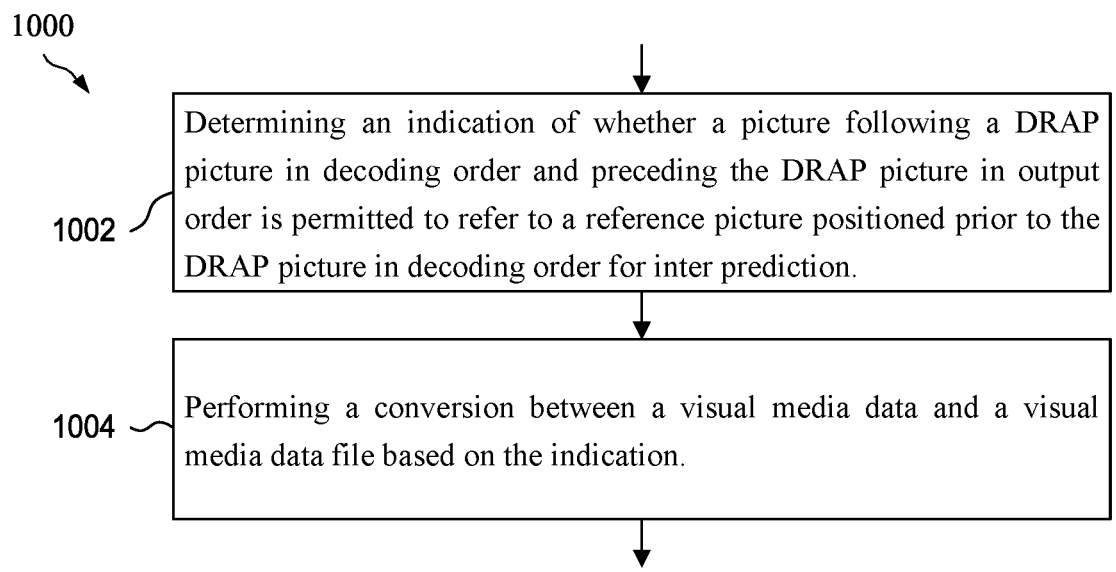
FIG. 10 is a flowchart for an example method of video processing.

FIG. 10 is a flowchart for an example method 1000 of video processing. The method 1000 includes determining (e.g., signaling) an indication at step 1002. The indication indicates whether a picture following a DRAP picture in decoding order and preceding the DRAP picture in output order is permitted to refer to a reference picture positioned prior to the DRAP picture in decoding order for inter prediction. At step 1004, a conversion is performed between a visual media data and a bitstream based on the indication. The bitstream may be stored in a visual media data file in ISOBMFF. The DRAP picture can be a DRAP picture or a CRR/EDRAP/type 2 DRAP picture, depending on the example. In an example, the indication is layer specific and further indicates whether the picture is permitted to refer to the reference picture when the reference picture is in a same layer as the picture. As noted above, the indication can be included in a SEI message, such as a DRAP indication SEI message, a type 2 DRAP indication SEI message, or combinations thereof. The SEI message can be associated with the DRAP and/or CRR picture. The indication can be a one bit flag or a multi bit indicator, depending on the example. In an example, the indication can be included as a bit in a t2drap_reserved_zero_13bits field in a SEI message.

For example, the indication can be set to a first value when indicating the picture following the DRAP picture in decoding order and preceding the DRAP picture in output order is permitted to refer to the reference picture positioned prior to the DRAP picture in decoding order for inter prediction. Further, the indication can be set to a second value when indicating the picture following the DRAP picture in decoding order and preceding the DRAP picture in output order is prevented from referring to the reference picture positioned prior to the DRAP picture in decoding order for inter prediction.

The indication can be signaled in various formats. For example, the indication can be set in a X value format where X is one or zero and the indication is set to one or zero. In another example, the indication can be set in a one minus X format where X is one or zero and the indication is set to zero or one. In some examples, the presence of absence of the indication can act as an indication. For example, an absence of the indication in a bitstream can indicate the picture following the DRAP picture in decoding order and preceding the DRAP picture in output order is permitted to refer to the reference picture positioned prior to the DRAP picture in decoding order for inter prediction. Furthermore, a presence of the indication in a bitstream can indicate the picture following the DRAP picture in decoding order and preceding the DRAP picture in output order is disallowed/prevented from referring to the reference picture positioned prior to the DRAP picture in decoding order for inter prediction. In another example, a presence of the indication in a bitstream can indicate the picture following the DRAP picture in decoding order and preceding the DRAP picture in output order is permitted to refer to the reference picture positioned prior to the DRAP picture in decoding order for inter prediction. Further, an absence of the indication in a bitstream indicates the picture following the DRAP picture in decoding order and preceding the DRAP picture in output order is disallowed/prevented from referring to the reference picture positioned prior to the DRAP picture in decoding order for inter prediction. In some examples, the indication can be signaled for each DRAP picture and each type 2 DRAP picture. In addition, a constraint can be employed such that any picture in a same layer as a DRAP picture and that follows the DRAP picture in decoding order shall follow in output order any picture that is in the same layer and precedes the DRAP picture in decoding order.

Figure 11:
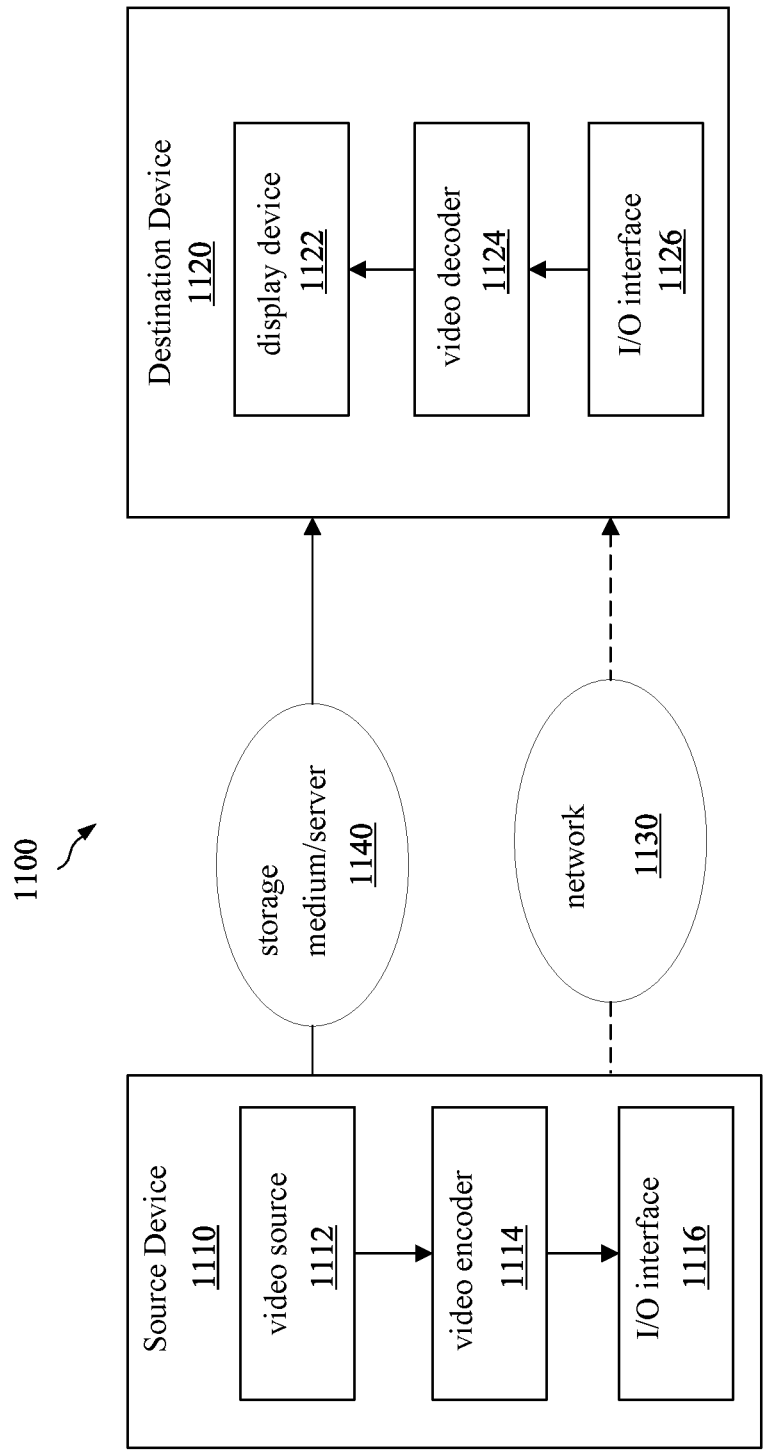
FIG. 11 is a block diagram that illustrates an example video coding system.

FIG. 11 is a block diagram that illustrates an example video coding system 1100 that may utilize the techniques of this disclosure. As shown in FIG. 11, video coding system 1100 may include a source device 1110 and a destination device 1120. Source device 1110 generates encoded video data which may be referred to as a video encoding device. Destination device 1120 may decode the encoded video data generated by source device 1110 which may be referred to as a video decoding device.

Source device 1110 may include a video source 1112, a video encoder 1114, and an input/output (I/O) interface 1116. Video source 1112 may include a source such as a video capture device, an interface to receive video data from a video content provider, and/or a computer graphics system for generating video data, or a combination of such sources. The video data may comprise one or more pictures. Video encoder 1114 encodes the video data from video source 1112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 1116 may include a modulator/demodulator (modem) and/or a transmitter. The encoded video data may be transmitted directly to destination device 1120 via I/O interface 1116 through network 1130. The encoded video data may also be stored onto a storage medium/server 1140 for access by destination device 1120.

Destination device 1120 may include an I/O interface 1126, a video decoder 1124, and a display device 1122. I/O interface 1126 may include a receiver and/or a modem. I/O interface 1126 may acquire encoded video data from the source device 1110 or the storage medium/server 1140. Video decoder 1124 may decode the encoded video data. Display device 1122 may display the decoded video data to a user. Display device 1122 may be integrated with the destination device 1120, or may be external to destination device 1120, which can be configured to interface with an external display device.

Video encoder 1114 and video decoder 1124 may operate according to a video compression standard, such as the High Efficiency Video Coding (HEVC) standard, Versatile Video Coding (VVC) standard and other current and/or further standards.

Figure 12:
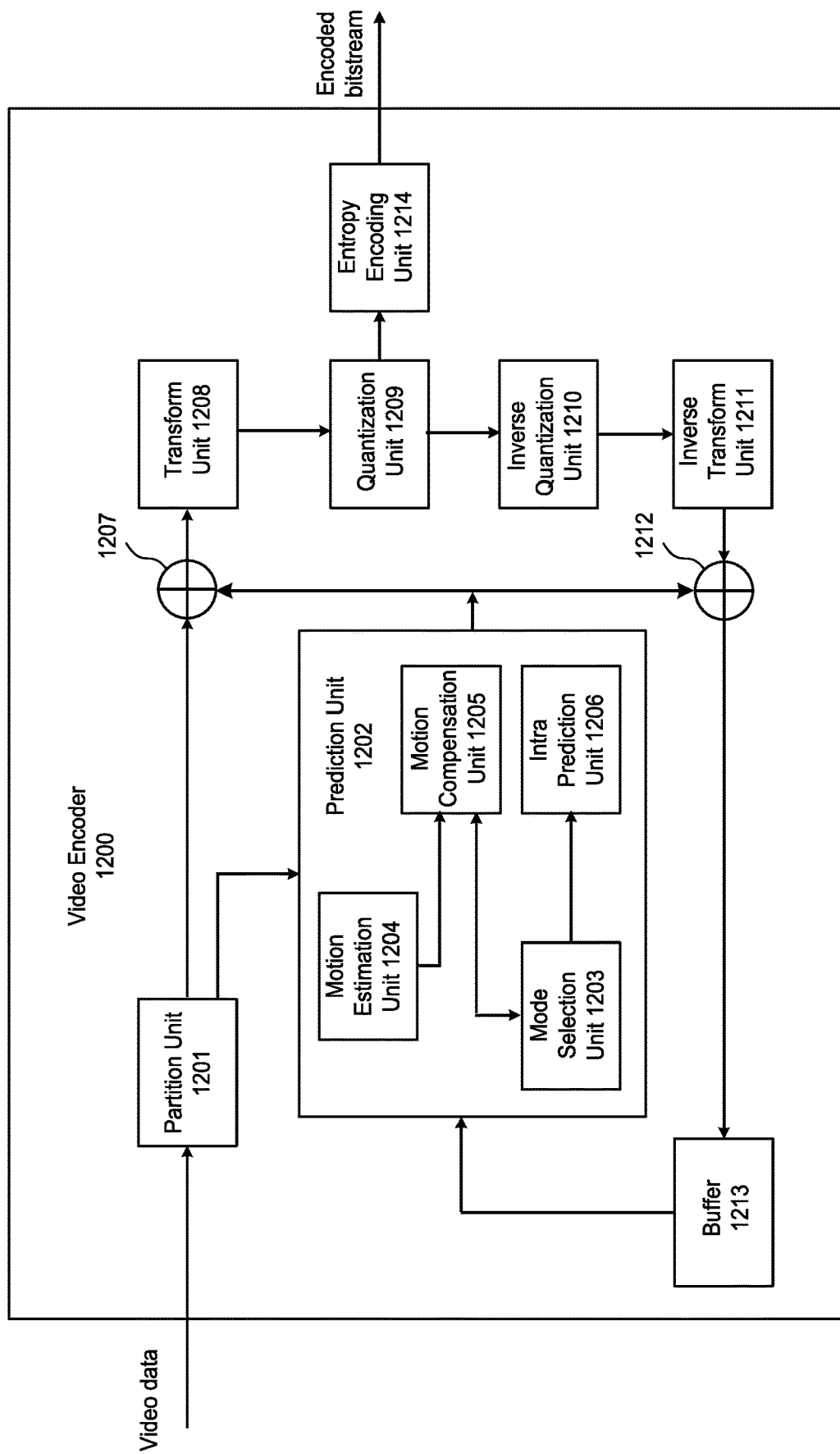
FIG. 12 is a block diagram that illustrates an example encoder.

FIG. 12 is a block diagram illustrating an example of video encoder 1200, which may be video encoder 1114 in the system 1100 illustrated in FIG. 11. Video encoder 1200 may be configured to perform any or all of the techniques of this disclosure. In the example of FIG. 12, video encoder 1200 includes a plurality of functional components. The techniques described in this disclosure may be shared among the various components of video encoder 1200. In some examples, a processor may be configured to perform any or all of the techniques described in this disclosure.

The functional components of video encoder 1200 may include a partition unit 1201, a prediction unit 1202 which may include a mode selection unit 1203, a motion estimation unit 1204, a motion compensation unit 1205, an intra prediction unit 1206, a residual generation unit 1207, a transform processing unit 1208, a quantization unit 1209, an inverse quantization unit 1210, an inverse transform unit 1211, a reconstruction unit 1212, a buffer 1213, and an entropy encoding unit 1214.

In other examples, video encoder 1200 may include more, fewer, or different functional components. In an example, prediction unit 1202 may include an intra block copy (IBC) unit. The IBC unit may perform prediction in an IBC mode in which at least one reference picture is a picture where the current video block is located.

Furthermore, some components, such as motion estimation unit 1204 and motion compensation unit 1205 may be highly integrated, but are represented in the example of FIG. 12 separately for purposes of explanation.

Partition unit 1201 may partition a picture into one or more video blocks. Video encoder 1200 and video decoder 1300 may support various video block sizes.

Mode selection unit 1203 may select one of the coding modes, intra or inter, e.g., based on error results, and provide the resulting intra or inter coded block to a residual generation unit 1207 to generate residual block data and to a reconstruction unit 1212 to reconstruct the encoded block for use as a reference picture. In some examples, mode selection unit 1203 may select a combination of intra and inter prediction (CIIP) mode in which the prediction is based on an inter prediction signal and an intra prediction signal. Mode selection unit 1203 may also select a resolution for a motion vector (e.g., a sub-pixel or integer pixel precision) for the block in the case of inter prediction.

To perform inter prediction on a current video block, motion estimation unit 1204 may generate motion information for the current video block by comparing one or more reference frames from buffer 1213 to the current video block. Motion compensation unit 1205 may determine a predicted video block for the current video block based on the motion information and decoded samples of pictures from buffer 1213 other than the picture associated with the current video block.

Motion estimation unit 1204 and motion compensation unit 1205 may perform different operations for a current video block, for example, depending on whether the current video block is in an I slice, a P slice, or a B slice.

In some examples, motion estimation unit 1204 may perform uni-directional prediction for the current video block, and motion estimation unit 1204 may search reference pictures of list 0 or list 1 for a reference video block for the current video block. Motion estimation unit 1204 may then generate a reference index that indicates the reference picture in list 0 or list 1 that contains the reference video block and a motion vector that indicates a spatial displacement between the current video block and the reference video block. Motion estimation unit 1204 may output the reference index, a prediction direction indicator, and the motion vector as the motion information of the current video block. Motion compensation unit 1205 may generate the predicted video block of the current block based on the reference video block indicated by the motion information of the current video block.

In other examples, motion estimation unit 1204 may perform bi-directional prediction for the current video block, motion estimation unit 1204 may search the reference pictures in list 0 for a reference video block for the current video block and may also search the reference pictures in list 1 for another reference video block for the current video block. Motion estimation unit 1204 may then generate reference indexes that indicate the reference pictures in list 0 and list 1 containing the reference video blocks and motion vectors that indicate spatial displacements between the reference video blocks and the current video block. Motion estimation unit 1204 may output the reference indexes and the motion vectors of the current video block as the motion information of the current video block. Motion compensation unit 1205 may generate the predicted video block of the current video block based on the reference video blocks indicated by the motion information of the current video block.

In some examples, motion estimation unit 1204 may output a full set of motion information for decoding processing of a decoder. In some examples, motion estimation unit 1204 may not output a full set of motion information for the current video. Rather, motion estimation unit 1204 may signal the motion information of the current video block with reference to the motion information of another video block. For example, motion estimation unit 1204 may determine that the motion information of the current video block is sufficiently similar to the motion information of a neighboring video block.

Figure 13:
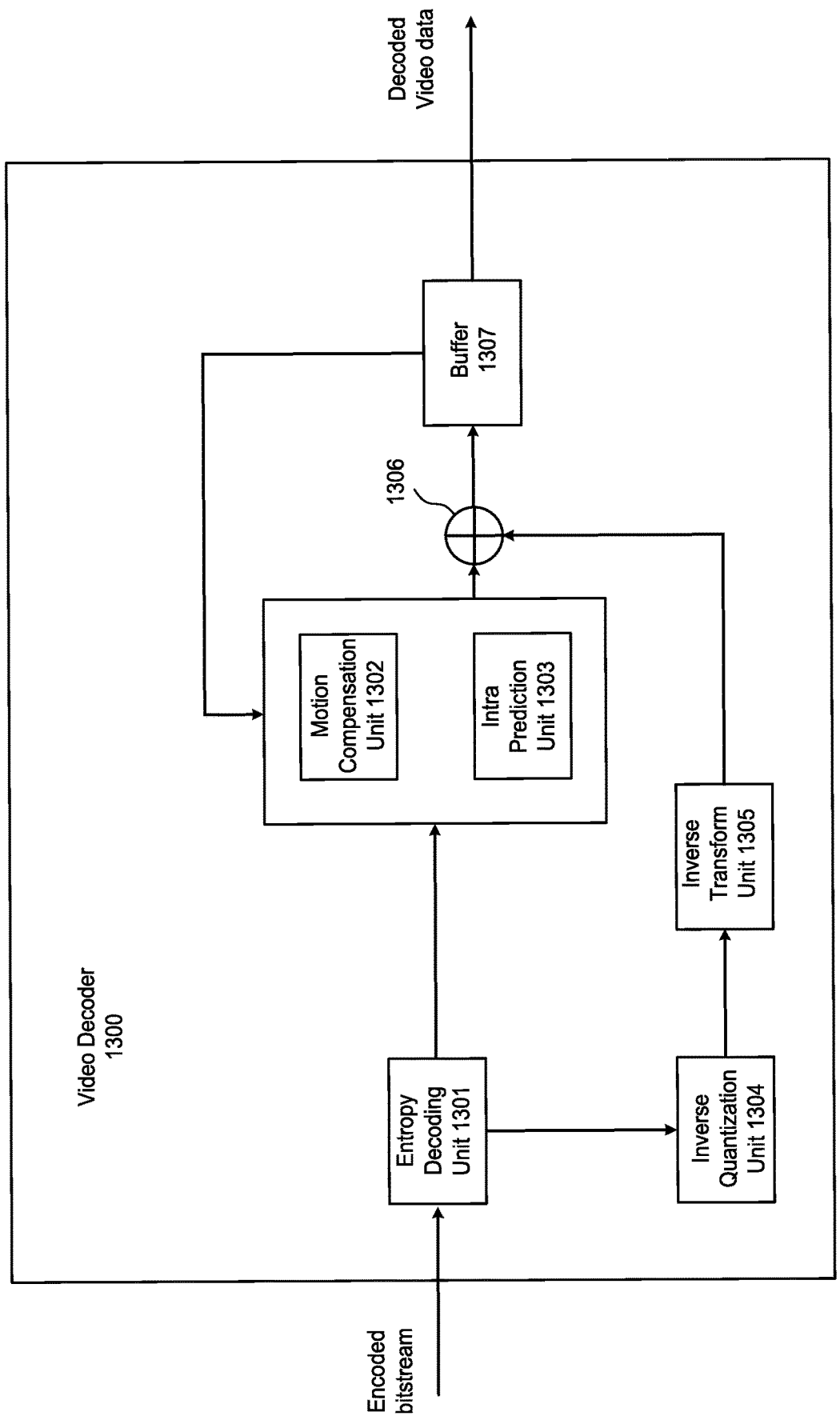
FIG. 13 is a block diagram that illustrates an example decoder.

In one example, motion estimation unit 1204 may indicate, in a syntax structure associated with the current video block, a value that indicates to the video decoder 1300 of FIG. 13 that the current video block has the same motion information as another video block.

In another example, motion estimation unit 1204 may identify, in a syntax structure associated with the current video block, another video block and a motion vector difference (MVD). The motion vector difference indicates a difference between the motion vector of the current video block and the motion vector of the indicated video block. The video decoder 1300 may use the motion vector of the indicated video block and the motion vector difference to determine the motion vector of the current video block.

As discussed above, video encoder 1200 may predictively signal the motion vector. Two examples of predictive signaling techniques that may be implemented by video encoder 1200 include advanced motion vector prediction (AMVP) and merge mode signaling.

Intra prediction unit 1206 may perform intra prediction on the current video block. When intra prediction unit 1206 performs intra prediction on the current video block, intra prediction unit 1206 may generate prediction data for the current video block based on decoded samples of other video blocks in the same picture. The prediction data for the current video block may include a predicted video block and various syntax elements.

Residual generation unit 1207 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 1207 may not perform the subtracting operation.

Transform processing unit 1208 may generate one or more transform coefficient video blocks for the current video block by applying one or more transforms to a residual video block associated with the current video block.

After transform processing unit 1208 generates a transform coefficient video block associated with the current video block, quantization unit 1209 may quantize the transform coefficient video block associated with the current video block based on one or more quantization parameter (QP) values associated with the current video block.

Inverse quantization unit 1210 and inverse transform unit 1211 may apply inverse quantization and inverse transforms to the transform coefficient video block, respectively, to reconstruct a residual video block from the transform coefficient video block. Reconstruction unit 1212 may add the reconstructed residual video block to corresponding samples from one or more predicted video blocks generated by the prediction unit 1202 to produce a reconstructed video block associated with the current block for storage in the buffer 1213.

After reconstruction unit 1212 reconstructs the video block, the loop filtering operation may be performed to reduce video blocking artifacts in the video block.

Entropy encoding unit 1214 may receive data from other functional components of the video encoder 1200. When entropy encoding unit 1214 receives the data, entropy encoding unit 1214 may perform one or more entropy encoding operations to generate entropy encoded data and output a bitstream that includes the entropy encoded data.

FIG. 13 is a block diagram illustrating an example of video decoder 1300 which may be video decoder 1124 in the system 1100 illustrated in FIG. 11.

The video decoder 1300 may be configured to perform any or all of the techniques of this disclosure. In the example of FIG. 13, the video decoder 1300 includes a plurality of functional components. The techniques described in this disclosure may be shared among the various components of the video decoder 1300. In some examples, a processor may be configured to perform any or all of the techniques described in this disclosure.

In the example of FIG. 13, video decoder 1300 includes an entropy decoding unit 1301. a motion compensation unit 1302, an intra prediction unit 1303, an inverse quantization unit 1304, an inverse transformation unit 1305, a reconstruction unit 1306, and a buffer 1307. Video decoder 1300 may, in some examples, perform a decoding pass generally reciprocal to the encoding pass described with respect to video encoder 1200 (FIG. 12).

Entropy decoding unit 1301 may retrieve an encoded bitstream. The encoded bitstream may include entropy coded video data (e.g., encoded blocks of video data). Entropy decoding unit 1301 may decode the entropy coded video data, and from the entropy decoded video data, motion compensation unit 1302 may determine motion information including motion vectors, motion vector precision, reference picture list indexes, and other motion information. Motion compensation unit 1302 may, for example, determine such information by performing the AMVP and merge mode.

Motion compensation unit 1302 may produce motion compensated blocks, possibly performing interpolation based on interpolation filters. Identifiers for interpolation filters to be used with sub-pixel precision may be included in the syntax elements.

Motion compensation unit 1302 may use interpolation filters as used by video encoder 1200 during encoding of the video block to calculate interpolated values for sub-integer pixels of a reference block. Motion compensation unit 1302 may determine the interpolation filters used by video encoder 1200 according to received syntax information and use the interpolation filters to produce predictive blocks.

Motion compensation unit 1302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 1303 may use intra prediction modes for example received in the bitstream to form a prediction block from spatially adjacent blocks. Inverse quantization unit 1304 inverse quantizes, i.e., de-quantizes, the quantized video block coefficients provided in the bitstream and decoded by entropy decoding unit 1301. Inverse transform unit 1305 applies an inverse transform.

Reconstruction unit 1306 may sum the residual blocks with the corresponding prediction blocks generated by motion compensation unit 1302 or intra prediction unit 1303 to form decoded blocks. If desired, a deblocking filter may also be applied to filter the decoded blocks in order to remove blockiness artifacts. The decoded video blocks are then stored in buffer 1307, which provides reference blocks for subsequent motion compensation/intra prediction and also produces decoded video for presentation on a display device.

Figure 14:
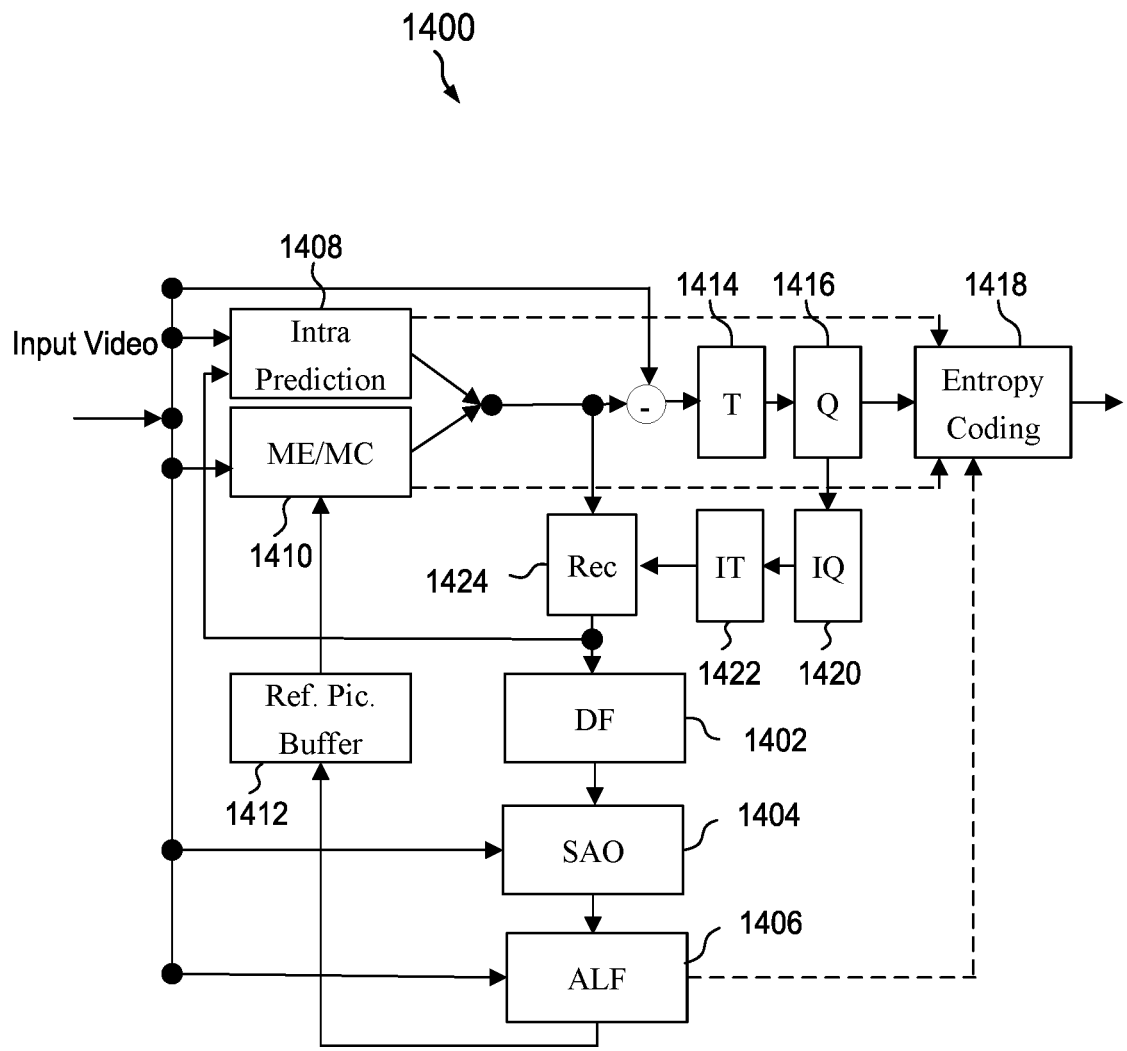
FIG. 14 is a schematic diagram of an example encoder.

FIG. 14 is a schematic diagram of an example encoder 1400. The encoder 1400 is suitable for implementing the techniques of VVC. The encoder 1400 includes three in-loop filters, namely a deblocking filter (DF) 1402, a sample adaptive offset (SAO) 1404, and an adaptive loop filter (ALF) 1406. Unlike the DF 1402, which uses predefined filters, the SAO 1404 and the ALF 1406 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 1406 is located at the last processing stage of each picture and can be regarded as a tool trying to catch and fix artifacts created by the previous stages.

The encoder 1400 further includes an intra prediction component 1408 and a motion estimation/compensation (ME/MC) component 1410 configured to receive input video. The intra prediction component 1408 is configured to perform intra prediction, while the ME/MC component 1410 is configured to utilize reference pictures obtained from a reference picture buffer 1412 to perform inter prediction. Residual blocks from inter prediction or intra prediction are fed into a transform (T) component 1414 and a quantization (Q) component 1416 to generate quantized residual transform coefficients, which are fed into an entropy coding component 1418. The entropy coding component 1418 entropy codes the prediction results and the quantized transform coefficients and transmits the same toward a video decoder (not shown). Quantization components output from the quantization component 1416 may be fed into an inverse quantization (IQ) components 1420, an inverse transform component 1422, and a reconstruction (REC) component 1424. The REC component 1424 is able to output images to the DF 1402, the SAO 1404, and the ALF 1406 for filtering prior to those images being stored in the reference picture buffer 1412.

A listing of solutions preferred by some examples is provided next.

The following solutions show examples of techniques discussed herein.

1. A visual media processing method (e.g., method 1000 depicted in FIG. 10), comprising performing (1004) a conversion between a video comprising a picture and a bitstream of the video, wherein the picture is coded in the bitstream as a dependent random access point (DRAP) picture; wherein the bitstream conforms to a format rule; wherein the format rule specifies whether a syntax element is included in a supplemental enhancement information (SEI) message indicating whether one or more pictures in a same layer as the DRAP picture following the DRAP picture in a decoding order and preceding the DRAP picture in an output order refer to a picture in the same layer for inter prediction, wherein the picture is earlier than the DRAP picture in a decoding order.

2. The method of solution 1, wherein the SEI message is a DRAP indication SEI message.

3. The method of solution 1, wherein the SEI message is different from a DRAP indication SEI message included in the bitstream.

4. The method of any of solutions 2-3, wherein the format rule specifies that presence of the SEI message indicates that one or more pictures in the same layer as the DRAP picture following the DRAP picture in the decoding order and preceding the DRAP picture in an output order are allowed to refer to the picture in the same layer for inter prediction, wherein the picture is earlier than the DRAP picture in the decoding order.

5. The method of any of solutions 2-3, wherein the format rule specifies that presence of the SEI message indicates that one or more pictures in the same layer as the DRAP picture following the DRAP picture in the decoding order and preceding the DRAP picture in an output order are not allowed to refer to the picture in the same layer for inter prediction, wherein the picture is earlier than the DRAP picture in the decoding order.

6. The method of any of solutions 1-5, wherein the syntax element comprises a one bit flag.

The following solutions show example embodiments of techniques discussed in the previous section.

7. A method of video processing, comprising: performing a conversion between a video comprising one or more pictures and a bitstream of the video; wherein the bitstream includes a type 2 dependent random access point (DRAP) picture; wherein the bitstream conforms to a format rule; wherein the format rule specifies to include, in the bitstream, a certain type of a dependent random access point (DRAP) indication syntax message to indicate whether pictures in a layer and following the type 2 DRAP picture in a decoding order but preceding the type 2 DRAP picture in an output order are allowed to refer to a picture in the layer and earlier than the type 2 DRAP picture in the decoding order for inter prediction.

8. The method of solution 7, wherein the certain type of the DRAP indication syntax message corresponds to a type 2 DRAP indication syntax message.

9. The method of solution 7, wherein the certain type of the DRAP indication syntax message corresponds to a DRAP indication syntax message.

10. The method of any of solutions 7-9, wherein the syntax element comprises a one bit flag.

The following solutions show example embodiments of techniques discussed in the previous section.

11. A method of video processing, comprising: performing a conversion between a video and a bitstream of the video; wherein the bitstream conforms to a format rule that specifies whether and how a cross-random access point reference (CRR) is signaled in a file format that stores the bitstream.

12. The method of solution 11, wherein the format rule defines a sample group that indicates the CRR.

13. The method of solution 11, wherein the format rule defines that a dependent random access point (DRAP) sample group includes the CRR.

14. The method of solution 13, wherein the DRAP sample group signaling the CRR includes a version field or a grouping_type_parameter field to signal the CRR.

The following solutions show example embodiments of techniques discussed in the previous section.

15. A method of video processing, comprising: performing a conversion between a video and a bitstream of the video; wherein the bitstream conforms to a format rule that specifies that when the bitstream includes a dependent random access point (DRAP) picture, a field is included in a DRAP sample entry indicative of a number of required random access point (RAP) samples for random access from a member of a DRAP sample group.

16. The method of solution 15, wherein the format rule further specifies to include another field indicative of a RAP identifier for the members of the DRAP sample group.

The following solutions show example embodiments of techniques discussed in the previous section.

17. A method of any of solutions 1-16, wherein a dependent random access point (DRAP) sample is a sample after which all samples in both decoding and output order can be correctly decoded in case that a closest initial sample preceding the DRAP sample is available for reference.

18. A method of any of solutions 1-17, further including storing the bitstream in a file compliant with a file format.

19. The method of any of solutions 1-17, wherein the bitstream is read out from a file compliant with a file format.

20. The method of any of solutions 18-19, wherein the file format is an International Standards Organization Base Media File Format (ISOBMFF).

21. A video decoding apparatus comprising a processor configured to implement a method recited in one or more of solutions 1 to 20.

22. A video encoding apparatus comprising a processor configured to implement a method recited in one or more of solutions 1 to 20.

23. A computer program product having computer code stored thereon, the code, when executed by a processor, causes the processor to implement a method recited in any of solutions 1 to 20.

24. A computer readable medium on which a bitstream complying to a bitstream format that is generated according to any of solutions 1 to 20.

25. A method comprising generating a bitstream according to a method recited in any of solutions 1 to 20 and writing the bitstream to a computer readable medium.

26. A method, apparatus or system described in the present document.

In the solutions described herein, an encoder may conform to a format rule by producing a coded representation according to the format rule. In the solutions described herein, a decoder may use a format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data comprising:
   determining an indication of whether a picture following a dependent random access point (DRAP) picture in decoding order and preceding the DRAP picture in output order is permitted to refer to a reference picture positioned prior to the DRAP picture in decoding order for inter prediction; and
   performing a conversion between a visual media data and a bitstream based on the indication.

2. The method of claim 1, wherein the DRAP picture is a type 2 DRAP picture which is an extended DRAP.

3. The method of claim 1, wherein the indication further indicates whether the picture is permitted to refer to the reference picture when the reference picture is in a same layer as the picture.

4. The method of claim 1, wherein the indication is signaled in an extended DRAP indication Supplemental Enhancement Information (SEI) message.

5. The method of claim 1, wherein the indication is a one bit flag.

6. The method of claim 1, wherein the indication is set to a first value when indicating the picture following the DRAP picture in decoding order and preceding the DRAP picture in output order is permitted to refer to the reference picture positioned prior to the DRAP picture in decoding order for inter prediction.

7. The method of claim 1, wherein the indication is set to a second value when indicating the picture following the DRAP picture in decoding order and preceding the DRAP picture in output order is prevented from referring to the reference picture positioned prior to the DRAP picture in decoding order for inter prediction.

8. The method of claim 1, wherein the indication is set in a X value format where X is one or zero and the indication is set to one or zero.

9. The method of claim 1, wherein the indication is set in a one minus X format where X is one or zero and the indication is set to zero or one.

10. The method of claim 4, wherein the indication reuses a bit of reserved zero bits for the extended DRAP indication SEI message.

11. The method of claim 1, wherein the conversion comprises generating the bitstream according to the visual media data.

12. The method of claim 1, wherein the conversion comprises parsing the bitstream to obtain the visual media data.

13. An apparatus for processing video data comprising a processor and a non-transitory memory with instructions thereon, wherein the instructions upon execution by the processor, cause the processor to:

determine an indication of whether a picture following a dependent random access point (DRAP) picture in decoding order and preceding the DRAP picture in output order is permitted to refer to a reference picture positioned prior to the DRAP picture in decoding order for inter prediction; and perform a conversion between a visual media data and a bitstream based on the indication.

14. The apparatus of claim 13, wherein the DRAP picture is a type 2 DRAP picture which is an extended DRAP, wherein the indication further indicates whether the picture is permitted to refer to the reference picture when the reference picture is in a same layer as the picture, wherein the indication is signaled in an extended DRAP indication Supplemental Enhancement Information (SEI) message, wherein the indication reuses a bit of reserved zero bits for the extended DRAP indication SEI message, and wherein the indication is a one bit flag.

15. The apparatus of claim 13, wherein the indication is set to a first value when indicating the picture following the DRAP picture in decoding order and preceding the DRAP picture in output order is permitted to refer to the reference picture positioned prior to the DRAP picture in decoding order for inter prediction, or wherein the indication is set to a second value when indicating the picture following the DRAP picture in decoding order and preceding the DRAP picture in output order is prevented from referring to the reference picture positioned prior to the DRAP picture in decoding order for inter prediction.

16. The apparatus of claim 13, wherein the indication is set in a X value format where X is one or zero and the indication is set to one or zero, or wherein the indication is set in a one minus X format where X is one or zero and the indication is set to zero or one.

17. A non-transitory computer readable medium comprising a computer program product for use by a video coding device, the computer program product comprising computer executable instructions stored on the non-transitory computer readable medium such that when executed by a processor cause the video coding device to:

determine an indication of whether a picture following a dependent random access point (DRAP) picture in decoding order and preceding the DRAP picture in output order is permitted to refer to a reference picture positioned prior to the DRAP picture in decoding order for inter prediction; and perform a conversion between a visual media data and a bitstream based on the indication.

18. The non-transitory computer readable medium of claim 17, wherein the DRAP picture is a type 2 DRAP picture which is an extended DRAP, wherein the indication further indicates whether the picture is permitted to refer to the reference picture when the reference picture is in a same layer as the picture, wherein the indication is signaled in an extended DRAP indication Supplemental Enhancement Information (SEI) message, wherein the indication reuses a bit of reserved zero bits for the extended DRAP indication SEI message, and wherein the indication is a one bit flag.

19. The non-transitory computer readable medium of claim 17, wherein the indication is set to a first value when indicating the picture following the DRAP picture in decoding order and preceding the DRAP picture in output order is permitted to refer to the reference picture positioned prior to the DRAP picture in decoding order for inter prediction, or wherein the indication is set to a second value when indicating the picture following the DRAP picture in decoding order and preceding the DRAP picture in output order is prevented from referring to the reference picture positioned prior to the DRAP picture in decoding order for inter prediction.

20. The non-transitory computer readable medium of claim 17, wherein the indication is set in a X value format where X is one or zero and the indication is set to one or zero, or wherein the indication is set in a one minus X format where X is one or zero and the indication is set to zero or one.

* * * * *